United States Patent
Ryu et al.

(10) Patent No.: US 11,194,895 B2
(45) Date of Patent: Dec. 7, 2021

(54) METHOD AND APPARATUS FOR AUTHENTICATING BIOMETRIC INFORMATION

(71) Applicant: Samsung Electronics Co., Ltd., Suwon-si (KR)

(72) Inventors: Youngsun Ryu, Suwon-si (KR); Duckey Lee, Suwon-si (KR); Kangjin Yoon, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 71 days.

(21) Appl. No.: 16/549,824

(22) Filed: Aug. 23, 2019

(65) Prior Publication Data
US 2020/0065463 A1 Feb. 27, 2020

(30) Foreign Application Priority Data
Aug. 24, 2018 (KR) .................. 10-2018-0099432

(51) Int. Cl.
*G06F 21/32* (2013.01)
*G06K 9/00* (2006.01)
*H04L 9/32* (2006.01)

(52) U.S. Cl.
CPC ......... *G06F 21/32* (2013.01); *G06K 9/00597* (2013.01); *G06K 9/00885* (2013.01); *G06K 2009/00932* (2013.01); *G06K 2009/00939* (2013.01); *H04L 9/3231* (2013.01)

(58) Field of Classification Search
CPC ...................................... G06F 21/32
See application file for complete search history.

(56) References Cited

U.S. PATENT DOCUMENTS

| | | | |
|---|---|---|---|
| 9,930,533 B2 | 3/2018 | Jin et al. | |
| 2007/0237366 A1 | 10/2007 | Maletsky | |
| 2011/0258450 A1 | 10/2011 | Tian | |
| 2012/0297464 A1 | 11/2012 | Busch et al. | |
| 2015/0244690 A1 | 8/2015 | Mossbarger | |

(Continued)

FOREIGN PATENT DOCUMENTS

| KR | 10-2016-0086830 A | | 7/2016 |
|---|---|---|---|
| KR | 20160086830 A | * | 7/2016 |

(Continued)

OTHER PUBLICATIONS

Machine translation of Jin et al, accessed Jan. 15, 2021, EPO, pp. 1-50 (Year: 2021).*

(Continued)

*Primary Examiner* — Edward Park

(57) ABSTRACT

A terminal, a server, and a system for authenticating biometric information and a biometric information authentication method are provided. A method, performed by a terminal, of registering biometric information includes: transmitting a registration request and biometric capability information of the terminal to a server; receiving biometric capability information of the server from the server; acquiring a user's biometric information based on the biometric capability information of the server; acquiring a pseudonymous identifier (PI) and auxiliary data (AD) based on the user's biometric information; and transmitting the PI and the AD to the server.

20 Claims, 18 Drawing Sheets

(56) References Cited

U.S. PATENT DOCUMENTS

2016/0226868 A1* 8/2016 Harding ................. H04L 63/10
2018/0191695 A1 7/2018 Lindemann

FOREIGN PATENT DOCUMENTS

| WO | 2004019164 A2 | 3/2004 |
| WO | 2016/128906 A1 | 8/2016 |
| WO | 2017044554 A1 | 3/2017 |
| WO | WO 2017/044554 A1 * | 3/2017 |

OTHER PUBLICATIONS

ISA/KR, International Search Report and Written Opinion of the International Searching Authority, International Application No. PCT/KR2019/010576, dated Dec. 16, 2019, 9 pages.
Supplementary European Search Report dated Jul. 1, 2021 in connection with European Patent Application No. EP 19 85 1198, 9 pages.

* cited by examiner

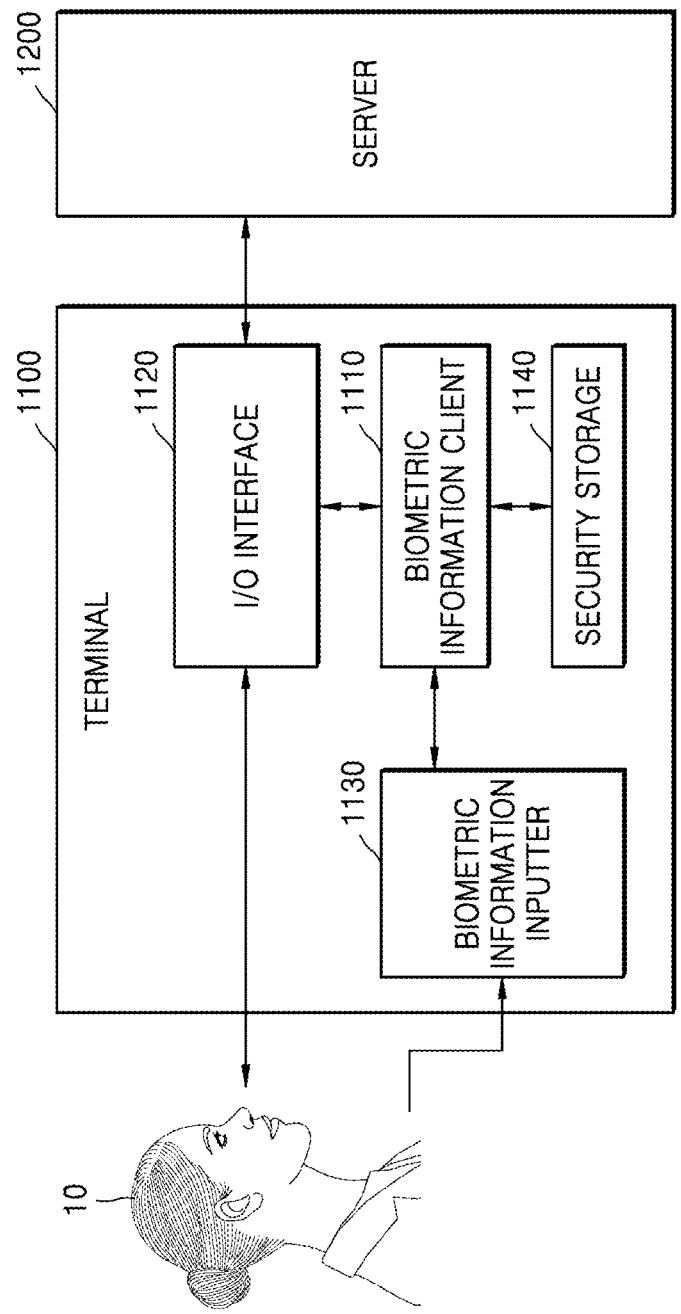

METHOD AND APPARATUS FOR AUTHENTICATING BIOMETRIC INFORMATION

CROSS-REFERENCE TO RELATED APPLICATION

This application is based on and claims priority under 35 U.S.C. § 119 to Korean Patent Application No. 10-2018-0099432 filed on Aug. 24, 2018 in the Korean Intellectual Property Office, the disclosure of which is incorporated by reference herein in its entirety.

BACKGROUND

1. Field

The disclosure relates to registration of biometric information and an apparatus and method of providing a service of authenticating biometric information, based on the registration of the biometric information.

2. Description of Related Art

Biometrics is an authentication method that involves extracting an individual's unique biometric features such as a fingerprint, a voice, a face, an iris, and blood vessels that are different for each individual and converting them into processible information. As the need for security becomes more important, biometric technologies have been widely used to authenticate users requesting access to an indoor area.

Biometric technologies employ various methods using parts of a human body, such as face recognition, fingerprint recognition, iris recognition, blood vessel recognition, etc. Unlike keys or passwords, an individual's characteristics such as a face shape, voice, a fingerprint, and an eyeball cannot be stolen or duplicated for use by another person. Furthermore, due to their low risk of change or loss, these characteristics are widely used in security applications.

Various services may be made available due to advancement in mobile communication systems and electronic devices. Thus, there is a need for methods of effectively providing services based on these biometric technologies.

SUMMARY

Provided are an apparatus and method capable of effectively providing a user authentication service using biometric information.

Additional aspects will be set forth in part in the description which follows and, in part, will be apparent from the description, or may be learned by practice of the embodiments of the disclosure.

According to an embodiment of the disclosure, a method, performed by a terminal, of registering biometric information includes: transmitting a registration request and biometric capability information of the terminal to a server; receiving biometric capability information of the server from the server; acquiring a user's biometric information based on the biometric capability information of the server; acquiring a pseudonymous identifier (PI) and auxiliary data (AD) based on the user's biometric information; and transmitting the PI and the AD to the server.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 illustrates a block diagram illustrating a detailed configuration of a biometric information authentication system according to an embodiment of the disclosure;

DETAILED DESCRIPTION

Figure 1:
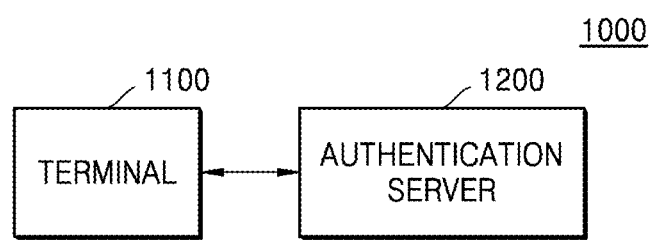
FIG. 1 illustrates a block diagram of a configuration of a biometric information authentication system according to an embodiment of the disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the disclosure will be described more fully with reference to the accompanying drawings. Furthermore, a method of constructing and using an electronic device, according to an embodiment of the disclosure, will be described in detail with reference to the accompanying drawings. In the drawings, like reference numerals or symbols refer to like components or elements performing substantially the same functions. It will be understood that, although the terms including an ordinal number such as "first", "second", etc. may be used herein to describe various elements or components, these elements or components should not be limited by the terms. The terms are only used to distinguish one element or component from another element or component. For example, a first element or component t to be discussed below may be termed a second element or component without departing from the scope of the disclosure. Similarly, a second element or component may be termed a first element or component. As used herein, the term "and/or" includes any and all combinations of one or more of the associated listed items. The terminology used herein is for the purpose of describing embodiments of the disclosure only and is not intended to limit the embodiments of the disclosure. As used herein, singular forms are intended to include the plural forms as well, unless the context clearly indicates otherwise. It will be further understood that the terms "comprises" and/or "includes" when used in this specification, specify the presence of stated features, integers, steps, operations, elements, components, or combinations thereof, but do not preclude the presence or addition of one or more other features, integers, steps, operations, elements, components, or combinations thereof.

Throughout the disclosure, the expression "at least one of a, b or c" indicates only a, only b, only c, both a and b, both a and c, both b and c, all of a, b, and c, or variations thereof.

FIG. 1 illustrates a block diagram of a configuration of a biometric information authentication system 1000 according to an embodiment of the disclosure.

Referring to FIG. 1, the biometric information authentication system 1000 includes a terminal 1100 and an authentication server 1200.

The terminal 1100 may acquire biometric information from a user. According to an embodiment of the disclosure, the biometric information refers to information containing biometric characteristics that are time invariant and unique for each user. For example, biometric information may be information about at least one of a face shape, an iris, a retina, veins, a fingerprint, or Deoxyribonucleic Acid (DNA). Biometric information may also be referred to as bioinformation.

The terminal 1100 may determine whether the user is an authorized user, based on the biometric information. In detail, the terminal 1100 may perform a biometric information registration procedure for registering information generated based on the user's biometric information and a biometric information authentication procedure. The biometric information authentication procedure involves comparing the registered information with information acquired when authentication is requested and determining whether the user is an authorized user.

According to an embodiment of the disclosure, in the biometric information registration procedure, the terminal 1100 may transmit a part of the information generated based on the user's biometric information to the authentication server 1200 and request registration from the authentication server 1200. Furthermore, when authentication is requested by the user, the terminal 1100 may transmit a part of the information generated based on the user's biometric information to the authentication server 1200 and receive a result of the authentication from the authentication server 1200. According to an embodiment of the disclosure, when authentication is requested by the user, the terminal 1100 may request transmission of additional information from the authentication server 1200, generate information based on the user's biometric information and the additional information received from the authentication server 1200, and transmit a part of the generated information to the authentication server 1200. The additional information received from the authentication server 1200 may include information registered during the biometric information registration procedure.

To protect the user's biometric information against an external attack, the terminal 1100 and the authentication server 1200 may transmit or receive information generated based on user's biometric information by using various types of security techniques. Furthermore, the authentication server 1200 may include a server for exchanging data with the terminal 1100 and a bioserver, which is separate from the server, for performing operations of processing and storing biometric information. However, this is merely an example, and a configuration of a server according to the disclosure is not limited thereto.

In addition, the terminal 1100 may obtain a template based on the biometric information acquired from the user. A template refers to feature information obtained by performing algorithmic processing based on biometric information to analyze and extract biometric characteristics in the biometric information and may include a user's unique biometric information. According to an embodiment of the disclosure, the template may include a pseudonymous identifier (hereinafter, referred to as a 'PI') and auxiliary data (hereinafter, referred to as 'AD'). The terminal 1100 may prevent the risk of leakage of the biometric information by using a template instead of directly using the user's biometric information for registration and authentication of the biometric information. According to an embodiment of the disclosure, the terminal 1100 may transmit biometric capability information of the terminal 1100 to the authentication server 1200 while requesting registration of the user's biometric information from the authentication server 1200. The biometric capability information refers to information about a biometric technology supported by the terminal 1100. Biometric technology may refer to technology that extracts unique biometric information of the user via an automated device to create a template. The biometric technology may also be referred to as bio authentication technology. According to an embodiment of the disclosure, biometric capability information may include items of biometric information (e.g., each user's face shape, iris, retina, veins, fingerprint, DNA, etc.) that may be acquired by the terminal 1100 and information about an algorithm performed to obtain a template based on the biometric information.

The terminal 1100 may receive biometric capability information of the authentication server 1200 from the authentication server 1200. The biometric capability information of the authentication server 1200 may refer to information about a biometric technology supported by the terminal 1100 among a plurality of biometric technologies supported by the authentication server 1200.

The terminal 1100 may acquire user's biometric information based on the biometric capability information of the authentication server 1200 and obtain a template based on the acquired biometric information. The terminal 1100 may transmit at least some of the obtained templates to the authentication server 1200 to register information generated based on the user's biometric information or authenticate the user.

FIG. 2 illustrates a block diagram illustrating a detailed configuration of a biometric information authentication system according to an embodiment of the disclosure.

Referring to FIG. 2, the biometric information authentication system includes a terminal 1100 and a server 1200. The terminal 1100 includes a biometric information client 1110, an input/output (I/O) interface 1120, a biometric information inputter 1130, and a security storage 1140.

The biometric information client 1110 performs operations of processing biometric information. The biometric information client 1110 may obtain a template based on biometric information acquired via the biometric information inputter 1130 and control the security storage 1140 to store the template. According to an embodiment of the disclosure, the biometric information client 1110 is located in a security area of the terminal 1100 to block access from outside. Alternatively, the biometric information client 1110 may include a hardware security module (HSM). The HSM is a dedicated crypto processor equipped with a key management system that ensures both hardware and cryptographic security. The HSM may use chips certified as being physically secure. In other words, the HSM may prevent an unauthorized access to information stored in a chip in terms of hardware and software.

The I/O interface 1120 may receive an input from a user 10 or provide a processing result to the user 10 via interactions with the user 10. Furthermore, the I/O interface 1120 may transmit or receive information while communicating with the server 1200. According to an embodiment of the disclosure, the I/O interface 1120 may be a web browser or a native application in a mobile operating system (OS).

The biometric information inputter 1130 acquires biometric information from the user 10. The biometric information inputter 1130 may include a sensor for acquiring biometric information. Biometric information that can be acquired by the biometric information inputter 1130 may vary depending on biometric capability information of the terminal 1100.

The security storage 1140 stores, based on control by the biometric information client 1110, information requiring security such as biometric information or a security key as will be described below. According to an embodiment of the disclosure, the security storage 1140 may include a trusted execution environment (TEE) or a secure element (SE). However, the security storage 1140 is not an essential component of the terminal 1100 according to the disclosure, or may not be used when a security key is not stored in the terminal 1100.

Figure 3A:
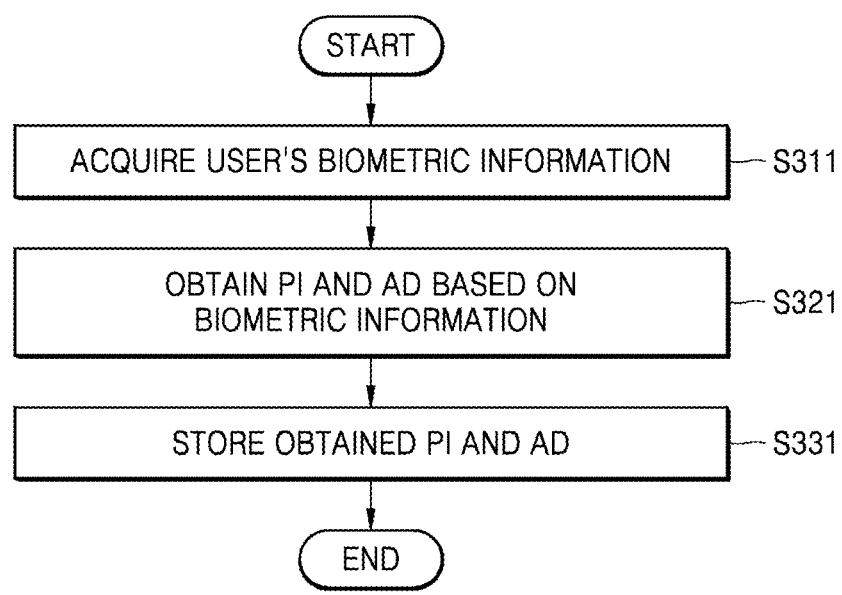
FIG. 3A illustrates a flowchart of a method of registering biometric information, according to an embodiment of the disclosure.
Figure 3B:
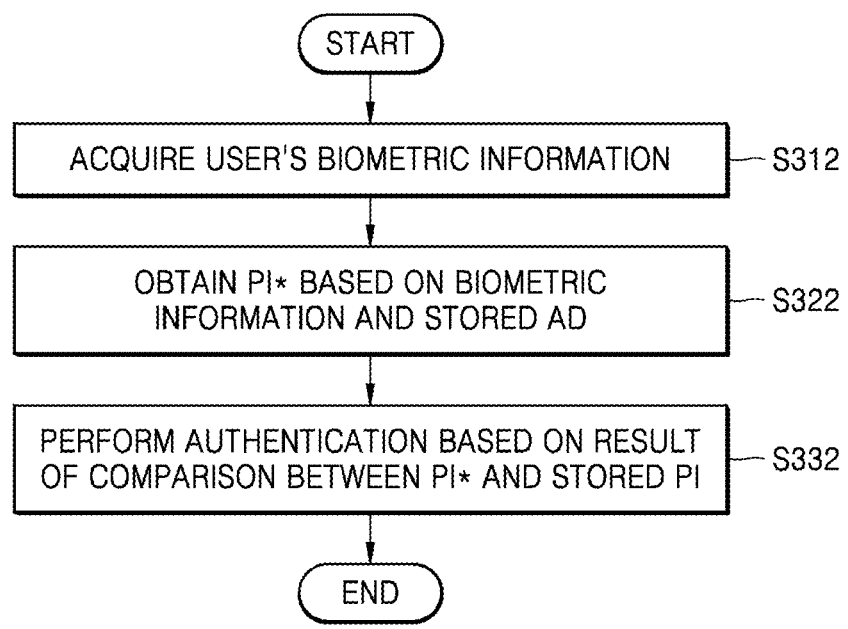
FIG. 3B illustrates a flowchart of a method of authenticating biometric information, according to an embodiment of the disclosure.

FIGS. 3A and 3B respectively illustrate a method of registering information generated based on biometric information and a method of authenticating a user based on the registered information.

FIG. 3A illustrates a flowchart of a biometric information registration method according to an embodiment of the disclosure. Referring to FIG. 3A, a terminal may obtain a template based on biometric information and store the obtained template.

The terminal acquires a user's biometric information (S311). The user's biometric information may vary based on biometric capability information of the terminal.

The terminal may obtain a PI and AD based on the acquired biometric information (S321). In detail, the terminal may extract feature values from the acquired biometric information by using a feature extractor. The terminal may obtain a PI and AD constituting a renewable biometric reference (RBR) by using a PI encoder (PIE), wherein the RBR is a biometric information authentication reference that is renewable from feature values.

A PI is a renewable individual's identifier. A PI is obtained based on biometric information as a hash value containing information acquired based on a feature value extracted from the biometric information. However, because the PI does not contain information used to reconstruct the biometric information, it is possible to prevent leakage of the user's biometric information even when the PI is leaked outside. AD is diversification data that allows creation of multiple PIs and for example, may contain a random number or a generated key. In other words, AD helps to generate multiple PIs from the same biometric characteristic. When the PI and corresponding AD are obtained, the terminal may delete biometric information and an extracted feature value.

The terminal stores the obtained PI and AD (S331). The PI and AD obtained based on the user's biometric information may be used as a reference for authenticating a user when the user subsequently requests authentication.

FIG. 3B illustrates a flowchart of a biometric information authentication method according to an embodiment of the disclosure.

The terminal acquires a user's biometric information (S312). The user's biometric information may vary based on biometric capability information of the terminal. According to an embodiment of the disclosure, when authentication is requested by the user, the terminal may request the user to select, based on biometric capability information, biometric information to be used for authentication from among pieces of supported biometric information and acquire the selected biometric information via a biometric information inputter. The terminal may obtain a recognized PI (hereinafter, referred to as 'PI*') based on the biometric information and stored AD by using a PI recorder (PIR) (S322). PI* is a PI obtained at the time of authentication to perform user authentication, i.e., to verify the true identity of the user. Unlike when acquiring a PI from the user's biometric information, PI* is generated based on biometric information and AD pre-acquired together with a PI.

The terminal performs a biometric authentication procedure based on a result of comparison between the PI* and the stored PI (S332). The terminal may compare PI* with PI by using a PI comparator (PIC) and provide an authentication result based on a comparison result.

Figure 4:
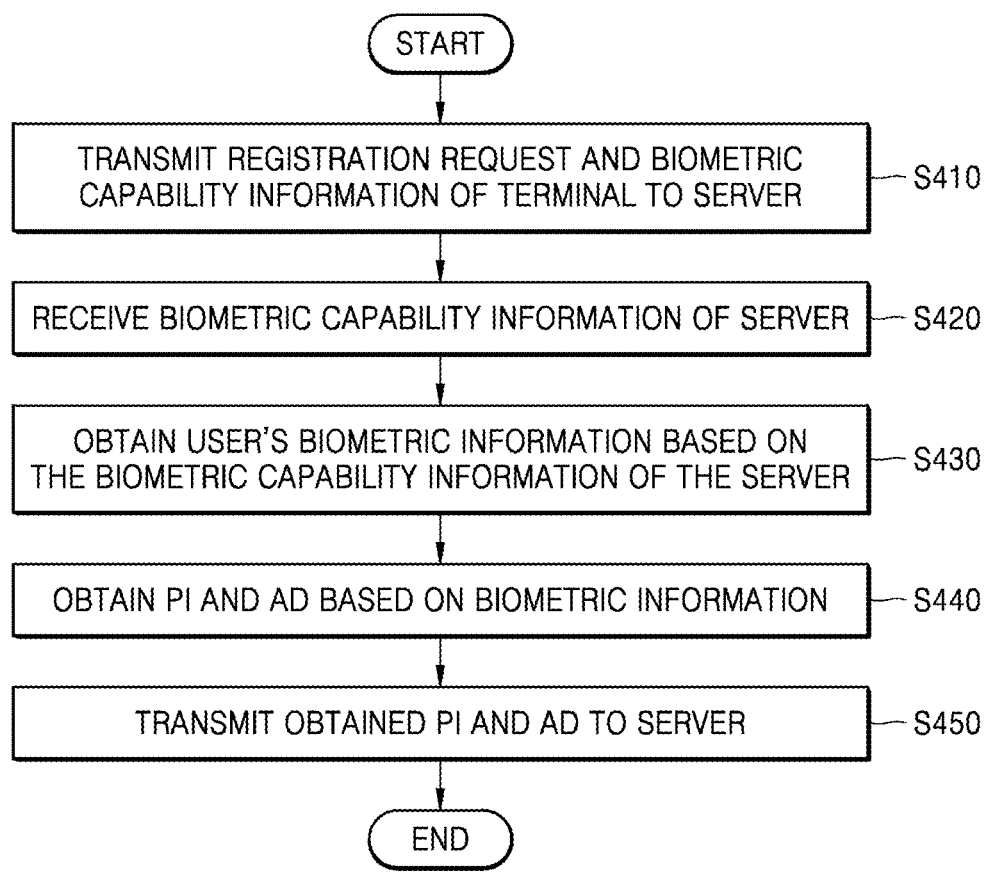
FIG. 4 illustrates a flowchart of a method of registering biometric information, according to an embodiment of the disclosure.

FIG. 4 illustrates a flowchart of a biometric information registration method according to an embodiment of the disclosure. Referring to FIG. 4, a terminal may transmit obtained PI and AD to a server.

The terminal may transmit biometric capability information of the terminal to the server while requesting the server to register information related to a user's biometric information (S410).

The terminal may receive biometric capability information of the server (S420). The biometric capability information of the server may be information related to a biometric technology supported by the terminal. The biometric technology may be selected from among a plurality of biometric technologies supported by the server based on the biometric capability information transmitted from the terminal to the server.

The terminal may acquire the user's biometric information based on the biometric capability information of the server (S430). The terminal may acquire the biometric information from the user via a biometric information inputter. According to an embodiment of the disclosure, the terminal may request the user to select, based on the biometric capability information of the server, biometric information to be used for authentication from among pieces of supported biometric information and acquire the selected biometric information via the biometric information inputter.

The terminal obtains a PI and corresponding AD based on the acquired user's biometric information (S440). The PI and AD may be determined in various ways based on an algorithm used by the terminal to obtain them. According to an embodiment of the disclosure, the terminal may obtain the PI and AD via a biometric information client.

The terminal transmits the obtained PI and AD to the server (S450). The server may complete a biometric information registration procedure by storing the PI and AD received from the terminal.

Figure 5:
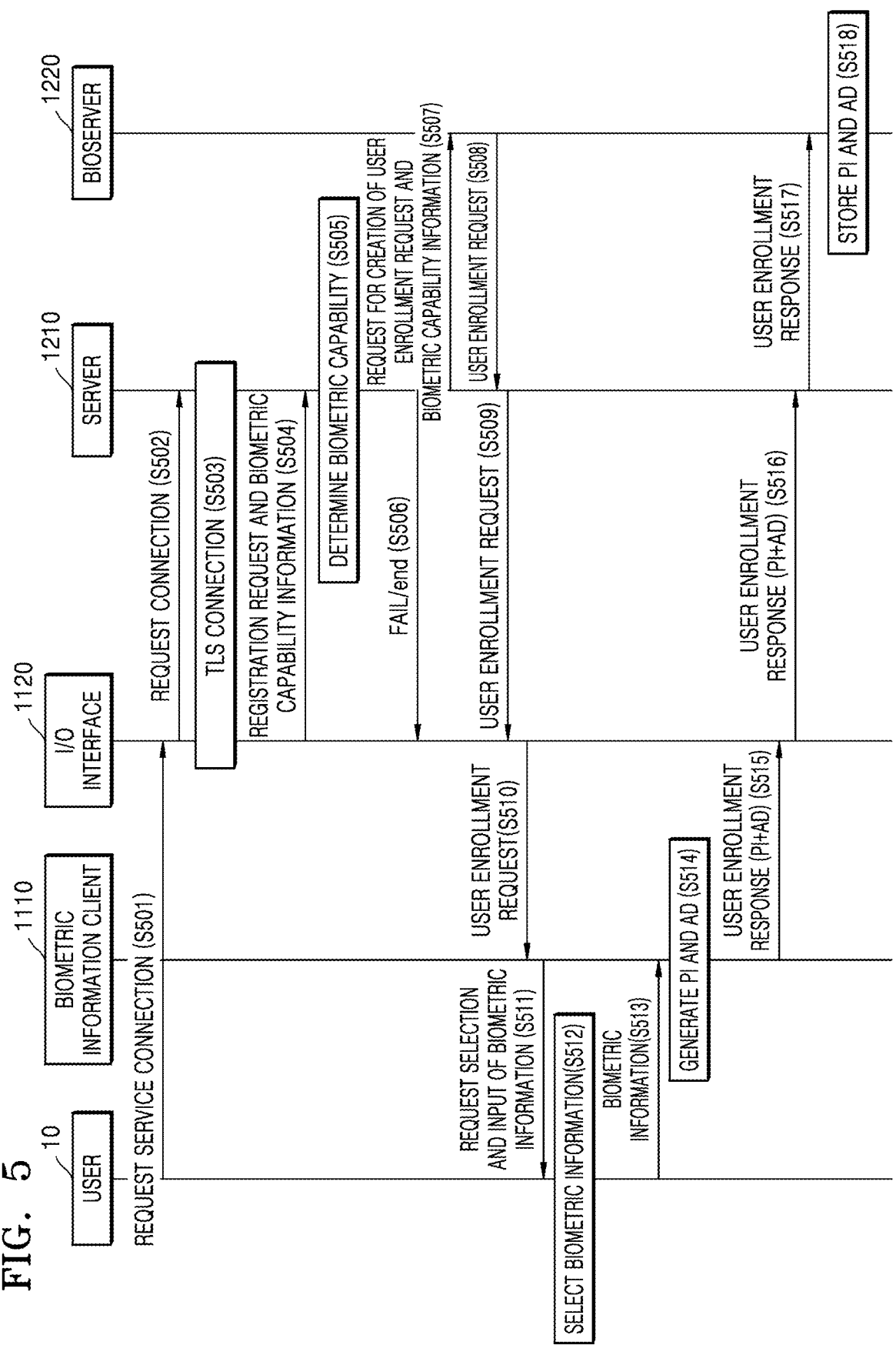
FIG. 5 illustrates a flow diagram for explaining a method of registering biometric information, according to an embodiment of the disclosure.

FIG. 5 illustrates a flow diagram for explaining a biometric information registration method according to an embodiment of the disclosure. In detail, FIG. 5 is a flow diagram for explaining operations of a biometric information authentication system including a terminal and a server in the biometric information registration method according to the embodiment of the disclosure described with reference to FIG. 4.

A user 10 may request a service connection from an I/O interface 1120 of a terminal (S501). The user's request for the service connection may be made by executing an application or a web browser.

The I/O interface 1120 may request a connection from a server 1210 (S502). The connection request may be made using a HyperText Transfer Protocol (HTTP) protocol. A transport layer security (TLS) channel may be created as a secure communication channel between the I/O interface 1120 and the server 1210 (S503).

The I/O interface 1120 may transmit to the server 1210 biometric capability information of the terminal and a registration request requiring the transmission of a user BioEnroll request (S504). The registration request may include an ID for identifying the user 10.

The server 1210 determines a biometric capability of the server 1210 S505). In detail, the server 1210 may select, based on the biometric capability information transmitted from the terminal to the server 1210, information related to a biometric technology supported by the terminal from among a plurality of biometric technologies supported by the server 1210. The server 1210 may acquire biometric capability information of the server 1210 based on the selected information.

When the biometric technologies supported by the server 1210 do not include a biometric technology supported by the terminal, the server 1210 transmits a FAIL signal to the I/O interface 1120 and terminates the registration procedure (S506).

The server 1210 may transmit a user's ID to a bioserver 1220 while requesting the bioserver 1220 to create a user BioEnroll request (S507). According to an embodiment of the disclosure, the server 1210 may transmit biometric capability information of the server 1210 to the bioserver 1220 or autonomously manage the biometric capability information without transmitting the same.

The bioserver 1220 may transmit the user BioEnroll request to the server 1210 (S508). The server 1210 may transmit the user BioEnroll request to the I/O interface 1120 (S509). In this case, the user BioEnroll request transmitted by the server 1210 may include the biometric capability information of the server acquired in operation S505. The I/O interface 1120 may transmit the user BioEnroll request to the biometric information client 1110 (S510).

The biometric information client 1110 requests the user 10 to select biometric technology and input biometric information with respect to the selected biometric technology (S511). In detail, when a plurality of biometric technologies are supportable based on the biometric capability information of the server, the biometric information client 1110 may allow the user to select his or her desired biometric technology (S512) and acquire biometric information based on the selected biometric technology (S513).

The biometric information client 1110 may generate a PI and corresponding AD based on the acquired biometric information (S514). The biometric information client 1110 may select an algorithm to be used to generate the PI and AD based on the biometric technology selected by the user 10 in operation S512.

The biometric information client 1110 transmits a user BioEnroll response to the I/O interface 1120 (S515). The user BioEnroll response may include the PI and AD generated in operation S514.

The user BioEnroll response including the PI and AD is transmitted to the bioserver 1220 through the server 1210 (S516 and S517).

The bioserver 1220 may store the received PI and AD (S518). The bioserver 1220 may store the received PI and AD in association with the user's ID. In other words, according to the embodiment of the disclosure described with reference to FIG. 5, the biometric information authentication system may create a database for biometric information authentication in the bioserver 1220 by using a user's personal terminal instead of a dedicated terminal.

Figure 6:
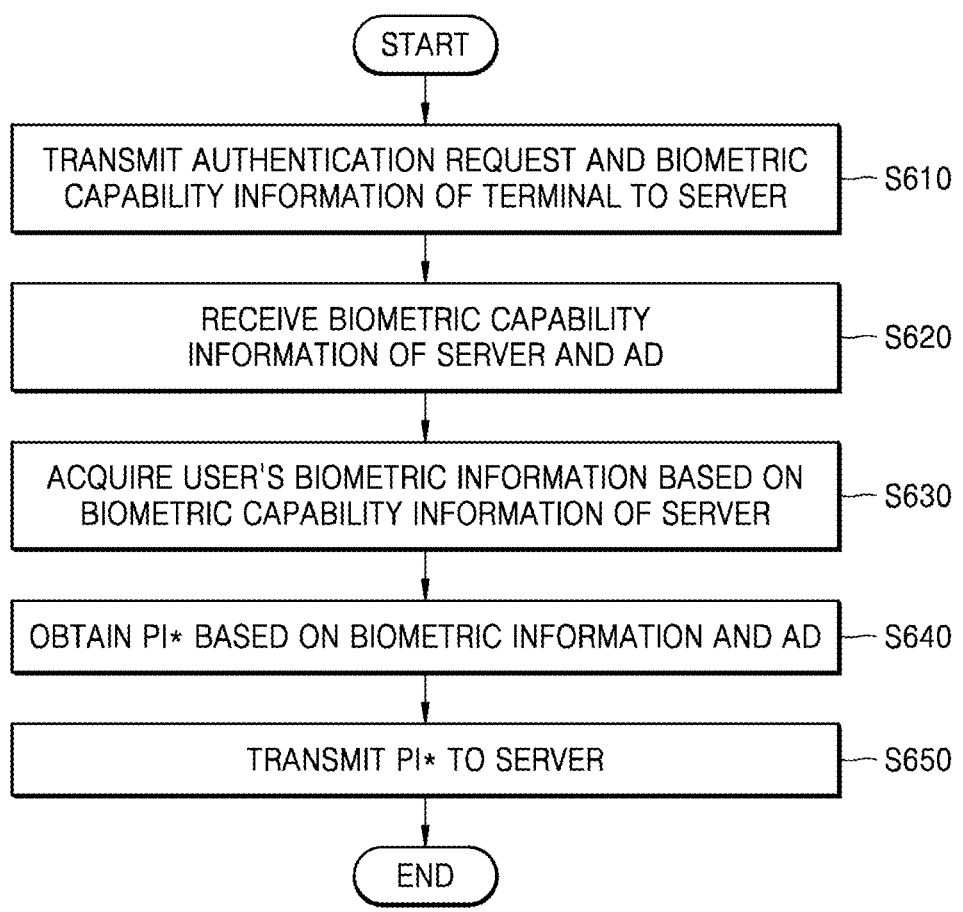
FIG. 6 illustrates a flowchart of a method of authenticating biometric information, according to an embodiment of the disclosure.

FIG. 6 illustrates a flowchart of a biometric information authentication method according to an embodiment of the disclosure. Referring to FIG. 6, a terminal may transmit an obtained PI* to a server.

The terminal may transmit biometric capability information of the terminal to the server while requesting the server to authenticate a user by using information related to the user's biometric information (S610).

The terminal may receive biometric capability information of the server and AD from the server (S620). The biometric capability information of the server may be information related to a biometric technology supported by the terminal. The biometric technology may be selected from among biometric technologies related to user information stored by the server based on the biometric capability information transmitted from the terminal to the server. AD may be registered according to a biometric information registration procedure and be acquired based on a selected biometric technology. According to an embodiment of the disclosure, the server may select a biometric technology suitable for authentication and a user's AD corresponding thereto and provide the selected biometric technology and user's AD to the terminal.

The terminal may acquire the user's biometric information based on the biometric capability information of the server (S630). The terminal may acquire biometric information from the user via the biometric information inputter. According to an embodiment of the disclosure, the terminal may request the user to select, based on the biometric capability information of the server, biometric information to be used for authentication from among pieces of supported biometric information and acquire the selected biometric information via the biometric information inputter The terminal obtains a PI* based on the acquired biometric information and the AD transmitted by the server (S640). According to an embodiment of the disclosure, the terminal may obtain a PI* via a biometric information client.

The terminal transmits the obtained PI* to the server (S650). The server may then compare the PI* received from the terminal with a PI stored during registration to return an authentication result to the terminal.

Figure 7:
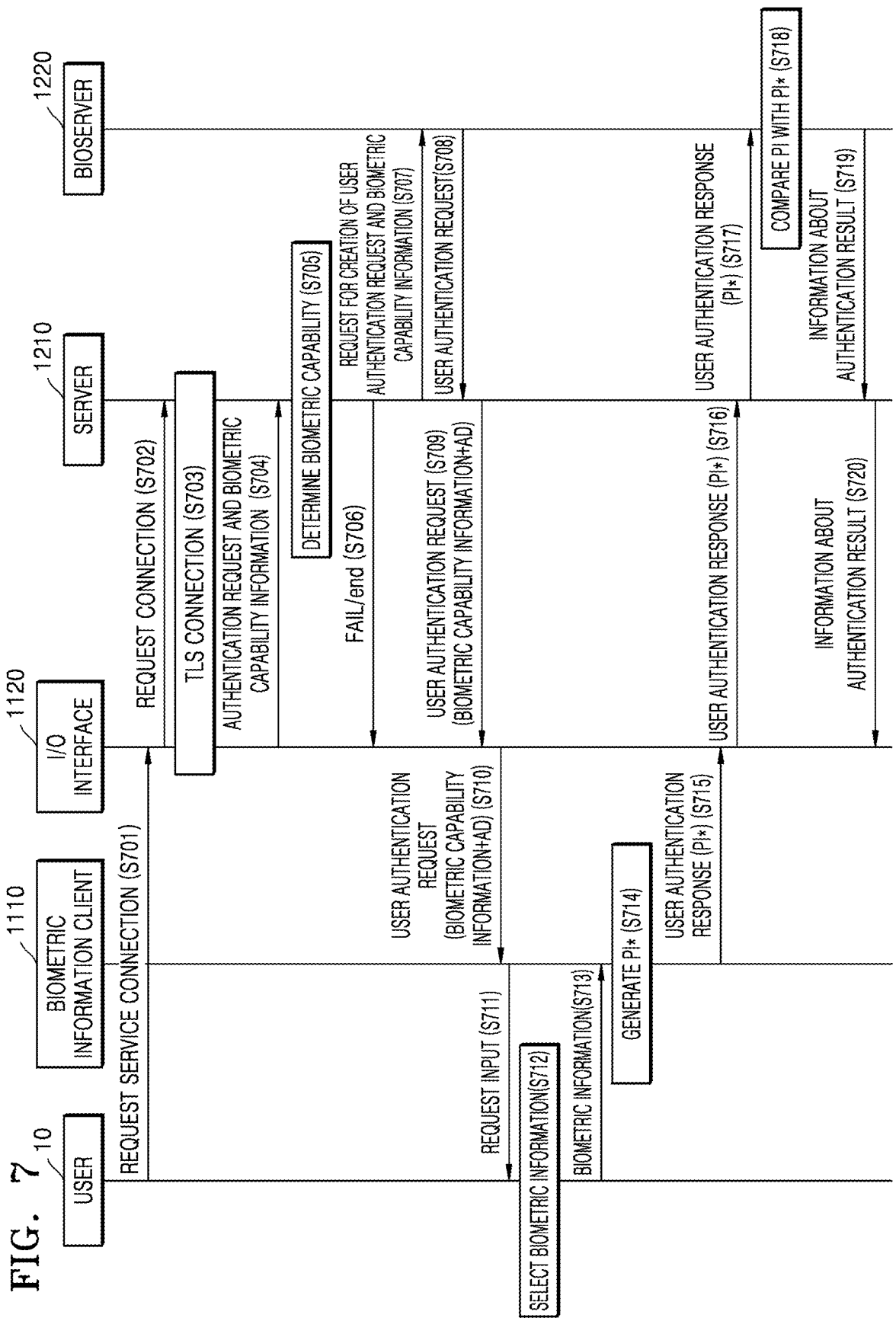
FIG. 7 illustrates a flow diagram for explaining a method of authenticating biometric information, according to an embodiment of the disclosure.

FIG. 7 illustrates a flow diagram for explaining a biometric information authentication method according to an embodiment of the disclosure. In detail, FIG. 7 is a flowchart for explaining operations of a biometric information authentication system including a terminal and a server in the biometric information authentication method according to the embodiment of the disclosure described with reference to FIG. 6.

A user 10 may request a service connection from an I/O interface 1120 of a terminal (S701). The user's request for the service connection may be made by executing an application or a web browser.

The I/O interface 1120 may request a connection from a server 1210 (S702). The connection request may be made using an HTTP protocol. A TLS channel may be created as a secure communication channel between the I/O interface 1120 and the server 1210 (S703).

The I/O interface 1120 may transmit to the server 1210 biometric capability information and an authentication request requiring the transmission of a user BioAuth Request) (S704). The authentication request may include an ID for identifying the user 10 who requests authentication.

The server 1210 determines its biometric capability (S705). In detail, the server 1210 may select, based on the biometric capability information transmitted from the terminal to the server 1210, information related to a biometric technology supported by the terminal from among a plurality of biometric technologies that are supported by the server 1210 and correspond to registered information of the user 10. The server 1210 may acquire biometric capability information of the server 1210 based on the selected information. According to an embodiment of the disclosure, the server 1210 may acquire a biometric technology suitable for authentication. Alternatively, according to another embodiment of the disclosure, the server 1210 may transmit biometric capability information based on a plurality of biometric technologies to a bioserver 1220 (S707) and receive from the bioserver 1220 information for selecting a biometric technology suitable for registered information about the user 10 and AD corresponding to the selected biometric technology.

When biometric technologies that are supported by the server 1210 and correspond to registered information of the user 10 are not supported by the terminal, the server 1210 transmits a FAIL signal to the I/O interface 1120 and terminates the authentication procedure (S706).

The server 1210 may transmit a user's ID to the bioserver 1220 while requesting the bioserver 1220 to create a user BioAuth request (S707). According to an embodiment of the disclosure, as described with reference to operation S705, the server 1210 may transmit biometric capability information to the bioserver 1220 or autonomously manage the biometric capability information without transmitting the same.

The bioserver 1220 may transmit the user BioAuth request to the server 1210 (S708). The user BioAuth request may include at least one AD corresponding to a biometric technology selected based on the biometric capability information of the server 1210.

The server 1210 may transmit the user BioAuth request to the I/O interface 1120 (S709). In this case, the user BioAuth request transmitted by the server 1210 may include the biometric capability information of the server acquired in operation S705. The I/O interface 1120 may transmit the user BioAuth request to the biometric information client 1110 (S710).

The biometric information client 1110 requests the user 10 to select biometric technology and input biometric information with respect to the selected biometric technology (S711). In detail, when a plurality of biometric technologies are supportable based on the biometric capability information of the server 1210, the biometric information client 1110 may allow the user 10 to select his or her desired biometric technology (S712) and acquire biometric information based on the selected biometric technology (S713).

The biometric information client 1110 may generate a PI* based on the acquired biometric information and the AD received from the server 1210 (S714). The biometric information client 1110 may select an algorithm to be used to generate the PI* based on the biometric technology selected by the user 10 in operation S712.

The biometric information client 1110 transmits a user BioAuth response to the I/O interface 1120 (S715). The user BioAuth response may include the PI* generated in operation S714.

The user BioAuth response including the PI* is transmitted to the bioserver 1220 through the server 1210 (S716 and S717).

The bioserver 1220 may compare the received PI* with a registered PI to determine a result of user authentication (S718). The bioserver 1220 may transmit information about the authentication result to the terminal through the server 1210 (S719 and S720).

Figure 8:
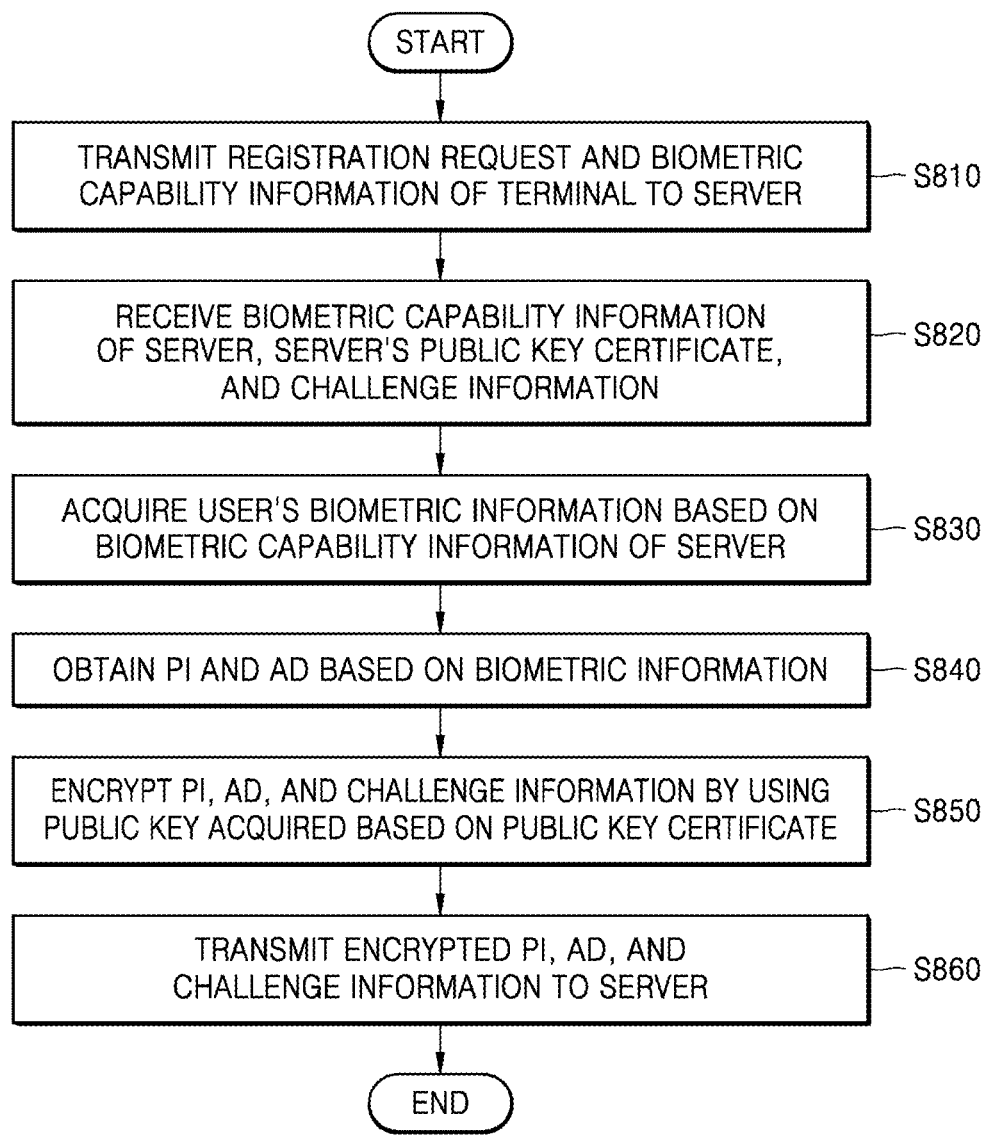
FIG. 8 illustrates a flowchart of a method of registering biometric information, according to an embodiment of the disclosure.

FIG. 8 illustrates a flowchart of a biometric information registration method according to an embodiment of the disclosure.

Referring to FIG. 8, a terminal may securely transmit acquired PI and AD to a server by using public key and certificate authentication.

The terminal may transmit biometric capability information of the terminal to the server while requesting the server to register information related to a user's biometric information (S810).

The terminal may receive biometric capability information of the server, a server's public key certificate, and challenge information (S820). The biometric capability information of the server may be information related to a biometric technology supported by the terminal. The biometric technology may be selected from among a plurality of biometric technologies supported by the server based on the biometric capability information transmitted from the terminal to the server. The server's public key certificate may be a certificate for a server's private key, which is issued by the certification authority (CA). The challenge information may be information generated and stored by the server to verify the reliability and integrity of information transmitted by the terminal.

The terminal may acquire a user's biometric information based on the biometric capability information of the server (S830). The terminal may acquire biometric information from the user via a biometric information inputter. According to an embodiment of the disclosure, the terminal may request the user to select, based on the biometric capability information of the server, biometric information to be used for authentication from among pieces of supported biometric information and acquire the selected biometric information via the biometric information inputter.

The terminal obtains a PI and corresponding AD based on the acquired user's biometric information (S840). The PI and the AD may be determined in various ways based on an algorithm used by the terminal to obtain them. According to an embodiment of the disclosure, the terminal may obtain the PI and AD via a biometric information client.

The terminal may encrypt the obtained PI and AD and the challenge information received from the server by using a public key acquired based on the server's public key certificate (S850). In detail, the terminal may obtain a server's public key from the server's public key certificate received from the server by using a certificate issued by the CA. The terminal may encrypt the PI and AD and the challenge information received from the server, based on the obtained server's public key.

The terminal transmits the encrypted PI, AD, and challenge information to the server (S860). The server may decrypt with its private key the encrypted PI, AD, and challenge information received from the terminal. The server may verify the reliability and integrity of the received information by using the challenge information and when the verification is successful, store the PI and AD to complete the biometric information registration procedure.

Figure 9:
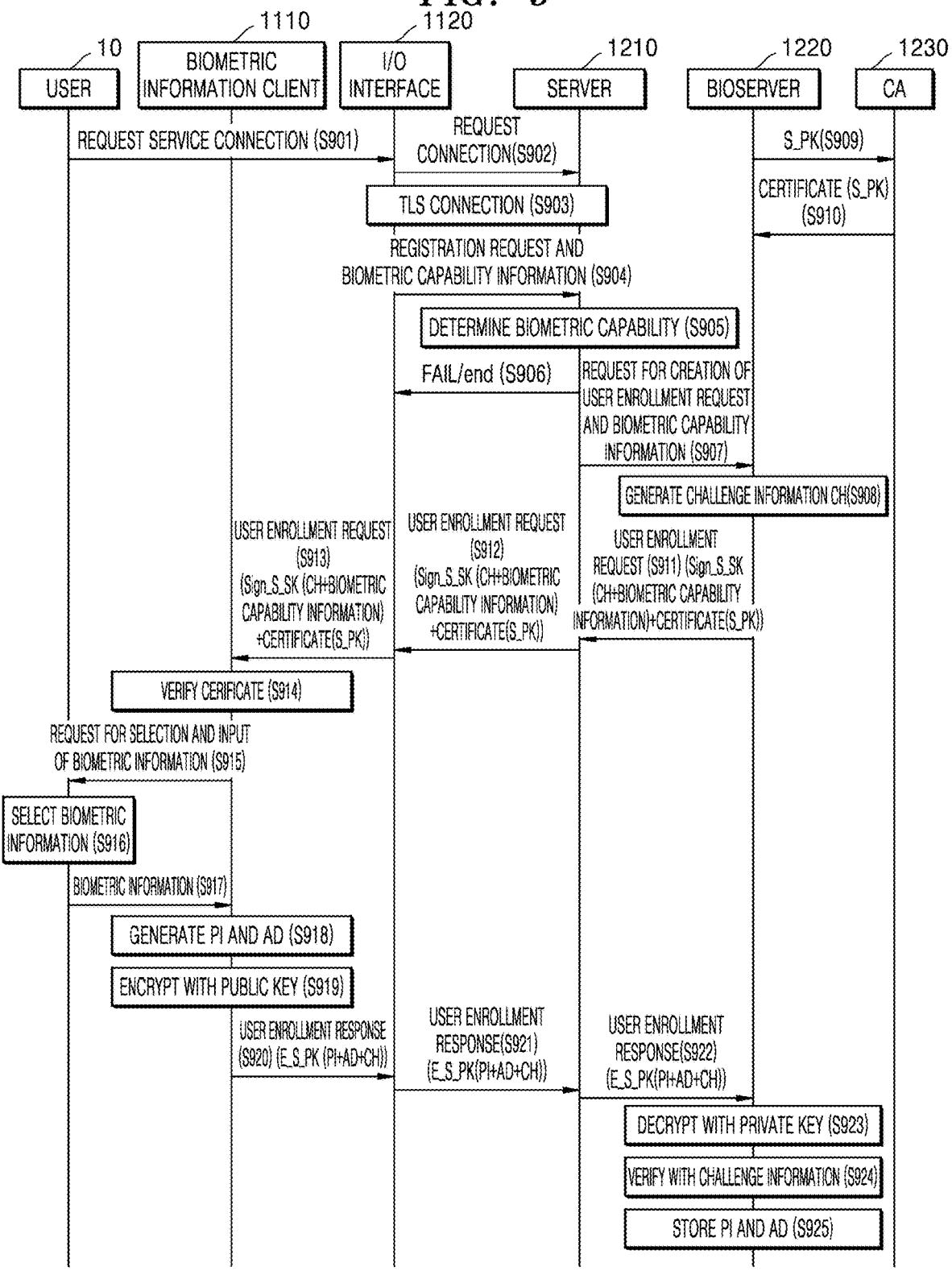
FIG. 9 illustrates a flow diagram for explaining a method of registering biometric information, according to an embodiment of the disclosure.

FIG. 9 illustrates a flow diagram for explaining a biometric information registration method according to an embodiment of the disclosure. In detail, FIG. 9 is a flow diagram for explaining operations of a biometric information authentication system including a terminal and a server in the biometric information registration method according to the embodiment of the disclosure described with reference to FIG. 8.

A user 10 may request a service connection from an I/O interface 1120 of a terminal (S901). The user's request for the service connection may be made by executing an application or a web browser.

The I/O interface 1120 may request a connection from a server 1210 (S902). The connection request may be made using an HTTP protocol. A TLS channel may be created as a secure communication channel between the I/O interface 1120 and the server 1210 (S903).

The I/O interface 1120 may transmit to the server 1210 biometric capability information and an enrollment request requiring the transmission of a user BioEnroll request (S904). The authentication request may include an ID for identifying the user 10 who requests authentication.

The server 1210 determines its biometric capability (S905). In detail, the server 1210 may select, based on the biometric capability information transmitted from the terminal to the server 1210, information related to a biometric technology supported by the terminal from among a plurality of biometric technologies that are supported by the server 1210 and correspond to registered information of the user 10. The server 1210 may acquire biometric capability information of the server 1210 based on the selected information.

When biometric technologies supported by the server 1210 do not include a biometric technology supported by the terminal, the server 1210 transmits a FAIL signal to the I/O interface 1120 and terminates the authentication procedure (S906).

The server 1210 may transmit a user's ID to a bioserver 1220 while requesting the bioserver 1220 to create a user BioEnroll request (S907). According to an embodiment of the disclosure, the server 1210 may transmit biometric capability information to the bioserver 1220 or autonomously manage the biometric capability information without transmitting the same.

The bioserver 1220 may generate challenge information CH (S908). The challenge information CH may be information generated by the server 1210 to verify the reliability and integrity of information transmitted by the terminal.

In addition, the bioserver 1220 may generate its public key pair consisting of a private key S_SK and a public key S_PK for data transmission and reception. The bioserver 1220 may transmit the public key S_PK to a CA 1230 (S909). The CA 1230 may provide the bioserver 1220 with a public key certificate including the public key S_PK of the bioserver 1220 encrypted with a private key of the CA 1230 (S910). The bioserver 1220 transmits a user BioEnroll request to the server 1210 (S911). In this case, the user BioEnroll request may include information, which is obtained by encrypting the challenge information CH generated in operation S908 and the biometric capability information with the private key S_SK of the bioserver 1220, and the public key certificate issued by the CA 1230. The server 1210 transmits the user BioEnroll request to the I/O interface 1120 (S912).

The I/O interface 1120 transmits the user BioEnroll request to the biometric information client 1110 (S913).

The biometric information client 1110 may verify the public key certificate of the bioserver 1220 contained in the user BioEnroll request (S914). In detail, the biometric information client 1110 may hold a certificate including a CA's public key and issued by the CA 1230. The biometric information client 1110 may verify and acquire the public key S_PK of the bioserver 1220 from the public key certificate of the bioserver 1220 by using the CA's certificate. The biometric information client 1110 may decrypt the encrypted challenge information CH and biometric capability information by using the public key S_PK of the bioserver 1220.

The biometric information client 1110 requests the user 10 to select biometric technology and input biometric information with respect to the selected biometric technology (S915). In detail, when a plurality of biometric technologies are supportable based on the biometric capability information of the server, the biometric information client 1110 may allow the user 10 to select his or her desired biometric technology (S916) and acquire biometric information based on the selected biometric technology (S917).

The biometric information client 1110 may obtain a PI and corresponding AD based on the acquired biometric information (S918). The biometric information client 1110 may select an algorithm to be used to generate the PI and AD based on the biometric technology selected by the user 10 in operation S916.

The biometric information client 1110 may encrypt the obtained PI and AD and the challenge information CH transmitted from the server 1210 by using the public key S_PK of the bioserver 1220 acquired based on the public key certificate (S919).

The biometric information client 1110 transmits a user BioEnroll response to the I/O interface 1120 (S920). The user BioEnroll response may include the PI, AD, and challenge information CH encrypted in operation S919.

The user BioEnroll response including the encrypted PI, AD, and challenge information CH are transmitted to the bioserver 1220 through the server 1210 (S921 and S922).

The bioserver 1220 decrypts the encrypted PI, AD, and challenge information CH with its private key S_SK (S923).

The bioserver 1220 verifies the reliability and integrity of received information by using the challenge information CH acquired in operation S923 (S924). According to an embodiment of the disclosure, the bioserver 1220 may verify the integrity of received information by comparing the challenge information CH acquired in operation S923 with stored challenge information. According to an embodiment of the disclosure, challenge information stored by the bioserver 1220 may vary over a predetermined time period. The bioserver 1220 may compare the challenge information CH acquired in operation S923 with the stored challenge information and determine, when they do not match each other, that the user enrollment response has expired.

When the verification is successful in operation S924, the bioserver 1220 may store the received PI and AD (S925). The bioserver 1220 may store the received PI and AD in association with a user's ID. According to the embodiment of the disclosure described with reference to FIG. 9, a biometric information authentication system may create a database for biometric information authentication in the bioserver 1220 by using a user's personal terminal instead of a dedicated terminal while ensuring security of information between the terminal and the server 1210.

Figure 10:
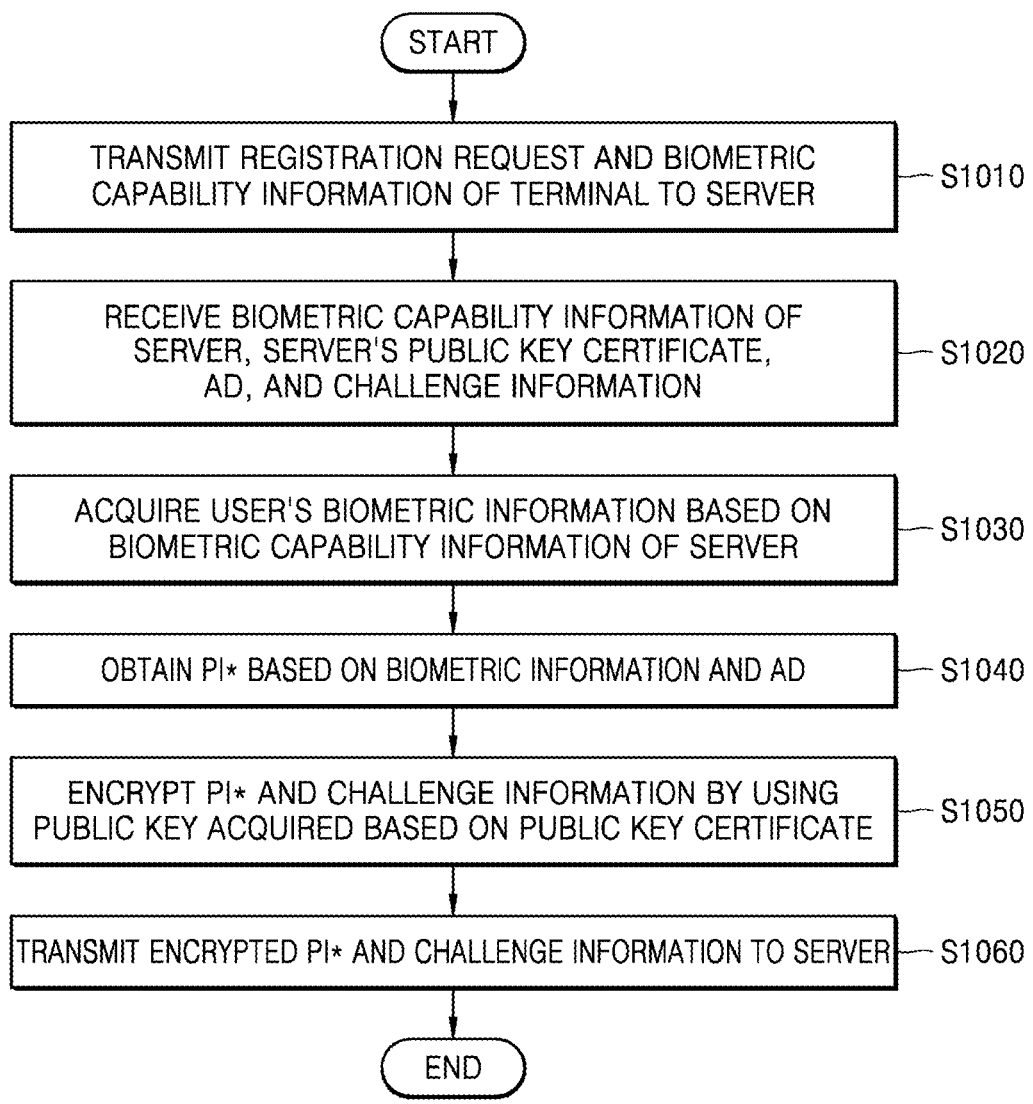
FIG. 10 illustrates a flowchart of a method of authenticating biometric information, according to an embodiment of the disclosure.

FIG. 10 illustrates a flowchart of a biometric information authentication method according to an embodiment of the disclosure.

Referring to FIG. 10, a terminal may securely receive AD and transmit PI* to a server by using public key and certificate authentication.

The terminal may transmit biometric capability information of the terminal to the server while requesting registration of information related to a user's biometric information from the server (S1010).

The terminal may receive from the server biometric capability information of the server, a server's public key certificate, AD, and challenge information (S1020). The biometric capability information of the server may be information related to a biometric technology supported by the terminal. The biometric technology may be selected from among a plurality of biometric technologies related to information stored by the server with respect to the user based on the biometric capability information transmitted from the terminal to the server. AD may be registered according to a biometric information registration procedure and be acquired based on a selected biometric technology. According to an embodiment of the disclosure, the server may select a biometric technology suitable for authentication and a user's AD corresponding thereto and provide the selected biometric technology and user's AD to the terminal. The server's public key certificate may be a certificate for a server's private key, which is issued by CA. The challenge information may be information generated and stored by the server to verify the reliability and integrity of information transmitted by the terminal.

The terminal may acquire a user's biometric information based on the biometric capability information of the server (S1030). The terminal may acquire biometric information from the user via a biometric information inputter. According to an embodiment of the disclosure, the terminal may request the user to select, based on the biometric capability information of the server, biometric information to be used for authentication from among pieces of supported biometric information and acquire the selected biometric information via the biometric information inputter.

The terminal obtains a PI* based on the acquired user's biometric information and the AD received from the server (S1040). According to an embodiment of the disclosure, the terminal may obtain a PI* via a biometric information client.

The terminal may encrypt the obtained PI* and the challenge information received from the server by using a public key acquired based on the server's public key certificate (S1050). In detail, the terminal may obtain a server's public key from the server's public key certificate received from the server by using a certificate issued by the CA. The terminal may encrypt the PI* and the challenge information received from the server by using the acquired server's public key.

The terminal transmits the encrypted PI* and challenge information to the server (S1060). The server may decrypt with its private key the encrypted PI* and challenge information received from the terminal. The server may verify the reliability and integrity of the received information by using the challenge information and, when the verification is successful, compare the received PI* with a PI stored during registration to return an authentication result to the terminal.

Figure 11:
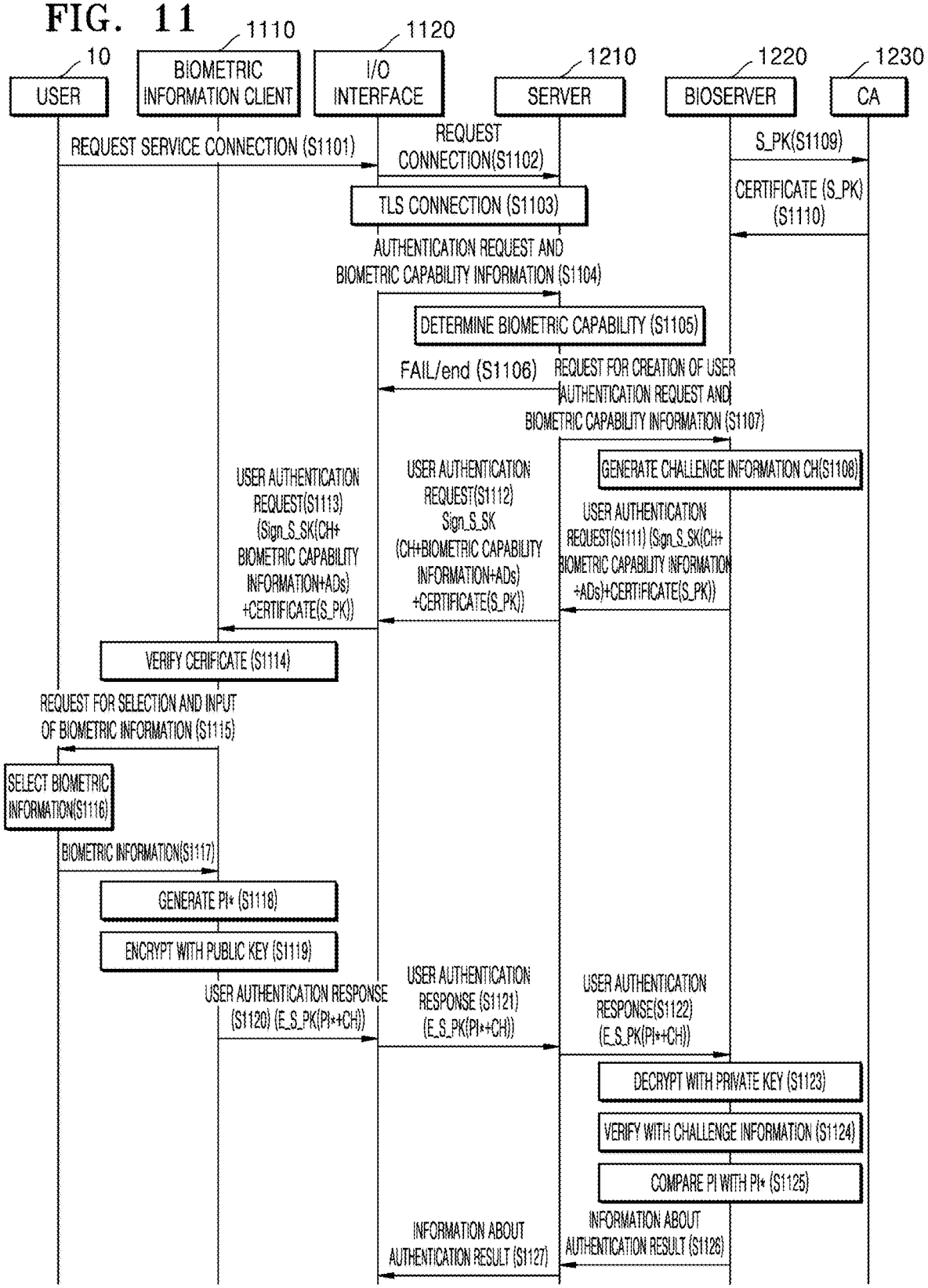
FIG. 11 illustrates a flow diagram for explaining a method of authenticating biometric information, according to an embodiment of the disclosure.

FIG. 11 illustrates a flowchart of a biometric information authentication method according to an embodiment of the disclosure. In detail, FIG. 11 is a flow diagram for explaining operations of a biometric information authentication system including a terminal and a server in the biometric information authentication method according to the embodiment of the disclosure described with reference to FIG. 10.

A user 10 may request a service connection from an I/O interface 1120 of a terminal (S1101). The user's request for the service connection may be made by executing an application or a web browser.

The I/O interface 1120 may request a connection from a server 1210 (S1102). The connection request may be made using an HTTP protocol. A TLS channel may be created as a secure communication channel between the I/O interface 1120 and the server 1210 (S1103).

The I/O interface 1120 may transmit to the server 1210 biometric capability information and an authentication request requiring the transmission of a user BioAuth request (S1104). The authentication request may include an ID for identifying the user 10 who requests authentication.

The server 1210 determines its biometric capability (S1105). In detail, the server 1210 may select, based on the biometric capability information transmitted from the terminal to the server 1210, information related to a biometric technology supported by the terminal from among a plurality of biometric technologies that are supported by the server 1210 and correspond to registered information of the user 10. The server 1210 may acquire biometric capability information of the server 1210 based on the selected information. According to an embodiment of the disclosure, the server 1210 may acquire a biometric technology suitable for authentication. Alternatively, according to another embodiment of the disclosure, in operation S1107, the server 1210 may transmit biometric capability information that is based on a plurality of biometric technologies to a bioserver 1220 and receive from the bioserver 1220 information for selecting a biometric technology suitable for the registered information of the user 10 and AD corresponding to the selected biometric technology.

When biometric technologies that are supported by the server 1210 and correspond to the registered information of the user 10 do not include a biometric technology supported by the terminal, the server 1210 transmits a FAIL signal to the I/O interface 1120 and terminates the authentication procedure (S1106).

The server 1210 may transmit a user's ID to the bioserver 1220 while requesting the bioserver 1220 to create a user BioAuth request (S1107). According to an embodiment of the disclosure, the server 1210 may transmit biometric capability information to the bioserver 1220 or autonomously manage the biometric capability information without transmitting the same.

The bioserver 1220 may generate challenge information CH (S1108). The challenge information CH may be information generated by the server 1210 to verify the reliability and integrity of information transmitted by the terminal.

In addition, the bioserver 1220 may generate its public key pair consisting of a private key S_SK and a public key S_PK for data transmission and reception. The bioserver 1220 may transmit the public key S_PK to a CA 1230 (S1109). The CA 1230 may provide the bioserver 1220 with a public key certificate including the public key S_PK of the bioserver 1220 encrypted with a private key of the CA 1230 (S1110). The bioserver 1220 transmits a user BioAuth request to the server 1210 (S1111). In this case, the user BioAuth request may include information, which is obtained by encrypting with a private key S_SK of the bioserver 1220 the challenge information CH generated in operation S1108, the biometric capability information of the server, and at least one AD corresponding to a biometric technology selected based on the biometric capability information, and the public key certificate issued by the CA 1230. The server 1210 transmits the user BioAuth request to the I/O interface 1120 (S1112).

The I/O interface 1120 transmits the user BioAuth request to the biometric information client 1110 (S1113).

The biometric information client 1110 may verify the public key certificate of the bioserver 1220 contained in the user BioAuth request (S1114). In detail, the biometric information client 1110 may hold a certificate including a CA's public key and issued by the CA 1230. The biometric information client 1110 may verify and acquire the public key S_PK of the bioserver 1220 from the public key certificate of the bioserver 1220 by using the CA's certificate. The biometric information client 1110 may decrypt the encrypted challenge information CH and biometric capability information by using the public key S_PK of the bioserver 1220.

The biometric information client 1110 requests the user 10 to select biometric technology and input biometric information with respect to the selected biometric technology (S1115). In detail, when a plurality of biometric technologies are supportable based on the biometric capability information of the server, the biometric information client 1110 may allow the user 10 to select his or her desired biometric technology (S1116) and acquire biometric information based on the selected biometric technology (S1117).

The biometric information client 1110 may generate a PI* and corresponding AD based on the acquired biometric information and the AD received from the server 1210 (S1118). The biometric information client 1110 may select an algorithm to be used to generate the PI* based on the biometric technology selected by the user 10 in operation S1116.

The biometric information client 1110 may encrypt the obtained PI* and the challenge information CH transmitted from the server 1210 by using the public key S_PK of the bioserver 1220 acquired based on the public key certificate (S1119).

The biometric information client 1110 transmits a user BioAuth response to the I/O interface 1120 (S1120). The user BioAuth response may include the PI* and challenge information CH encrypted in operation S1119.

The user BioAuth response including the encrypted PI* and challenge information CH are transmitted to the bioserver 1220 through the server 1210 (S1121 and S1122).

The bioserver 1220 decrypts the encrypted PI* and challenge information CH with its private key S_SK (S1123).

The bioserver 1220 verifies the reliability and integrity of received information by using the challenge information CH acquired in operation S1123 (S1124). According to an embodiment of the disclosure, the bioserver 1220 may verify the integrity of received information by comparing the challenge information CH acquired in operation S1123 with stored challenge information. According to an embodiment of the disclosure, challenge information stored by the bioserver 1220 may vary over a predetermined time period. The bioserver 1220 may compare the challenge information CH acquired in operation S1123 with the stored challenge information and determine, when they do not match each other, that the user BioAuth response has expired.

When the verification is successful in operation S1124, the bioserver 1220 may compare the received PI* with a registered PI to determine a result of user authentication.

The bioserver 1220 may transmit information about the authentication result to the terminal through the server 1210 (S1126 and S1127).

According to the embodiment of the disclosure described with reference to FIG. 11, the biometric information authentication system may perform an authentication procedure based on biometric information while ensuring security of information between the terminal and the server 1210.

Figure 12:
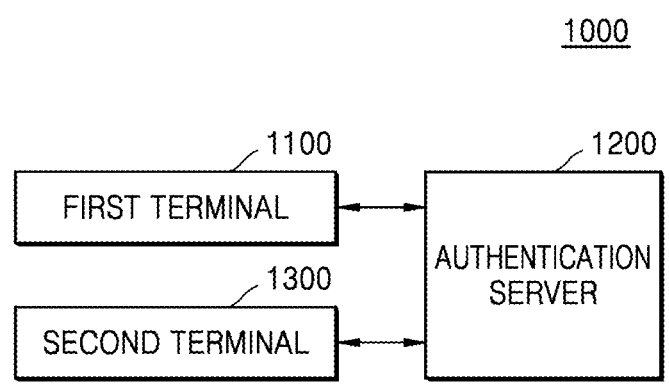
FIG. 12 illustrates diagram for explaining a method of registering and transferring biometric information, according to an embodiment of the disclosure.

FIG. 12 illustrates diagram for explaining a method of registering and transferring biometric information, according to an embodiment of the disclosure. According to an embodiment of the disclosure, a biometric information authentication system 1000 may perform registration and authentication on biometric information by using a Fast Identity Online (FIDO) Universal Authentication Framework (UAF) defined by a FIDO Alliance. Referring to FIG. 12, a user may access the biometric information authentication system 100 based on a FIDO by using a first terminal 1100 and then additionally or exclusively using a second terminal 1300 as a new terminal, as described in more detail below with reference to FIG. 12.

The user may log in to a service via the first terminal 1100 by using ID and password authentication. In detail, the first terminal 1100 may generate its public key pair consisting of a public key and a private key to store the private key and transmit the public key to an authentication server 1200. The authentication server 1200 may complete the registration procedure by storing the received public key together with ID information of the user. Thereafter, when the user is authenticated through a login, etc., the first terminal 1100 may sign the user authentication request received from the authentication server 1200 by using the stored private key and transmit the signed user authentication request to the authentication server 1200. The authentication server 1200 may verify the signed user authentication request with the stored public key and determine an authentication result.

In this case, to change an authentication modality to biometric information authentication or add the same, the user may initiate a biometric information registration procedure, and after the biometric information registration procedure is completed, the user authenticate himself or herself based on the biometric information.

According to an embodiment of the disclosure, the first terminal 1100 may transmit only an authentication result to the authentication server 1200 by using public key authentication without transmitting a template associated with biometric information thereto. In detail, the user may input biometric information to the first terminal 1100 via a biometric information inputter of the first terminal 1100. The first terminal 1100 may obtain a template based on the biometric information and store the obtained template.

When the user is authenticated using ID information and a password, the first terminal 1100 may generate a new public key pair for biometric information authentication to store a private key and transmit a public key to the authentication server 1200 The authentication server 1200 may store the received public key together with ID information of the user to complete the registration procedure.

In addition, the user who has completed the registration procedure for biometric information authentication may request authentication based on biometric information to access a service. When the authentication is requested by the user, the first terminal 1100 may request the authentication from the authentication server 1200, and the authentication server 1200 may transmit, in response to such a request, a user authentication request to the first terminal 1100.

The first terminal 1100 may receive biometric information from the user in response to the user authentication request from the authentication server 1200, and authenticate the user by comparing a template obtained based on the received biometric information against a stored template. When the user is authenticated, the first terminal 1100 may sign the user authentication request received from the authentication server 1200 by using the stored private key and transmit the signed user authentication request to the authentication server 1200. The authentication server 1200 may verify the signed user authentication request with the stored public key and determine an authentication result.

According to another embodiment of the disclosure, during registration, the first terminal 1100 may transmit at least a part of a template associated with biometric information to the authentication server 1200.

In detail, the user may input biometric information to the first terminal 1100 via the biometric information inputter of the first terminal 1100. The first terminal 1100 may obtain a template based on the biometric information and store the obtained template.

When the user is authenticated using ID information and a password, the first terminal 1100 may create a new public key pair for biometric information authentication to store a private key and transmit a public key to the authentication server 1200, together with information about biometrics that is a part of the stored template. The authentication server 1200 may complete the registration procedure by storing the received public key and information about biometrics, together with ID information of the user.

In addition, the user who has completed the registration procedure for biometric information authentication may request authentication based on biometric information to access a service. When the authentication is requested by the user, the first terminal 1100 may request the authentication from the authentication server 1200, and the authentication server 1200 may transmit, in response to such a request, a user authentication request to the first terminal 1100. According to an embodiment of the disclosure, the authentication server 1200 may include the stored information about biometrics in the user authentication request for transmission.

The first terminal 1100 may receive biometric information from the user in response to the user authentication request from the authentication server 1200, and authenticate the user by comparing a template obtained based on the received biometric information with the stored template. According to an embodiment of the disclosure, the first terminal 1100 may obtain a new template based on the stored template and the biometric information, or based on the information about biometrics received from the authentication server 1200 and the biometric information. When the user is authenticated, the first terminal 1100 may sign the user authentication request received from the authentication server 1200 by using the stored private key and transmit the signed user authentication request to the authentication server 1200. The authentication server 1200 may verify the signed user authentication request with the stored public key and determine an authentication result.

In addition, when the user desires to be authenticated using biometric information via the second terminal 1300 that is a new terminal, it is necessary to revoke the public key of the first terminal 1100 from the authentication server 1200 and register a public key of the second terminal 1300 with the authentication server 1200.

Figure 13A:
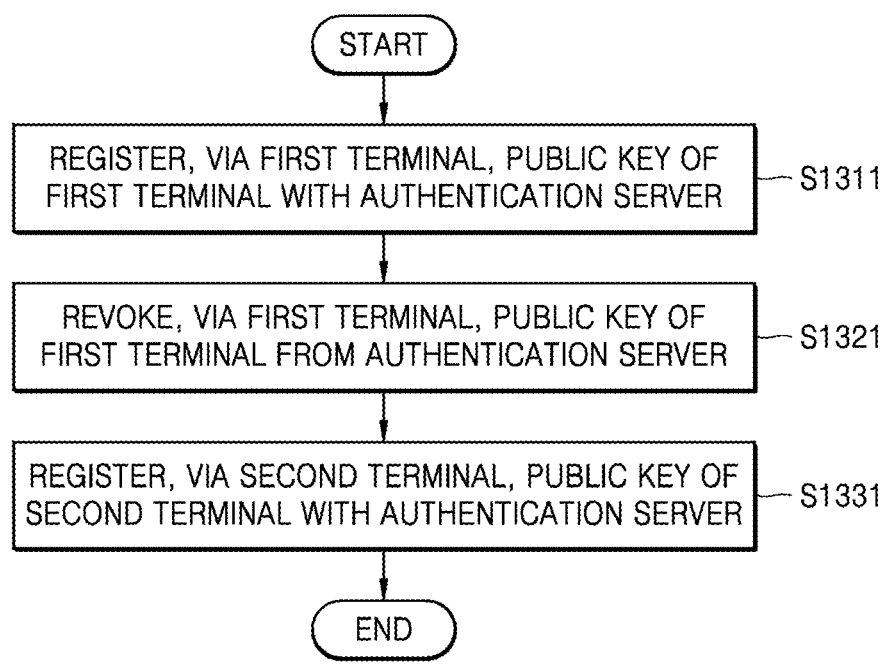
FIG. 13A illustrates a flowchart of a method of registering and transferring biometric information, according to an embodiment of the disclosure.

FIG. 13A illustrates a flowchart of a method of registering and transferring biometric information, according to an embodiment of the disclosure.

After logging in to a service by using ID information and a password via a first terminal performing authentication based on biometric information, the user registers, via the first terminal, a public key of the first terminal with an authentication server (S1311). A detailed description thereof is already provided above with reference to FIG. 12.

The user revokes, via the first terminal, the public key of the first terminal from the authentication server (S1321). When the public key is removed from the authentication server, the first terminal may revoke its stored private key.

After logging in to a service by using ID information and a password via a second terminal performing authentication based on biometric information, the user registers, via the second terminal, a public key of the second terminal with the authentication server (S1331). A detailed description thereof is already provided above with reference to FIG. 12.

Figure 13B:
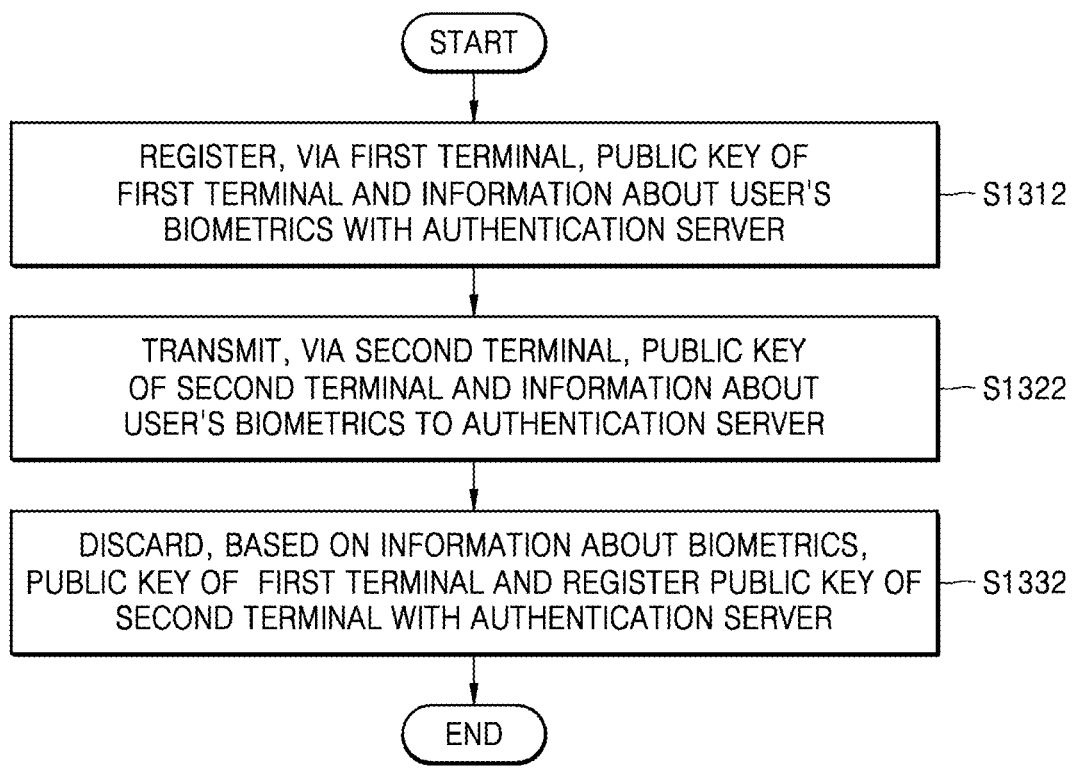
FIG. 13B illustrates a flowchart of a method of registering and transferring biometric information, according to an embodiment of the disclosure.

FIG. 13B illustrates a flowchart of a method of registering and transferring biometric information, according to an embodiment of the disclosure.

After logging in to a service by using ID information and a password via a first terminal performing authentication based on biometric information, the user registers, via the first terminal, a public key of the first terminal and information about biometrics generated based on biometric information with an authentication server (S1312). According to an embodiment of the disclosure, the information about biometrics may be a part of a template generated based on the biometric information. For example, the information about biometrics may be a PI and corresponding AD. A detailed description thereof is already provided above with reference to FIG. 12.

The user transmits, via a second terminal, the information about the biometrics generated based on the biometric information to the authentication server, together with the public key of the second terminal (S1322). According to an embodiment of the disclosure, the information about biometrics transmitted by the user may be PI*.

In operation S1332, the authentication server may authenticate the user based on the registered information about biometrics. After the authentication is completed, the authentication server may revoke the public key of the first terminal and register the public key of the second terminal with the authentication server itself. Referring to FIG. 13B, a biometric information authentication system may provide transfer of a service between a plurality of terminals without entering a user's ID information and password.

Figure 14:
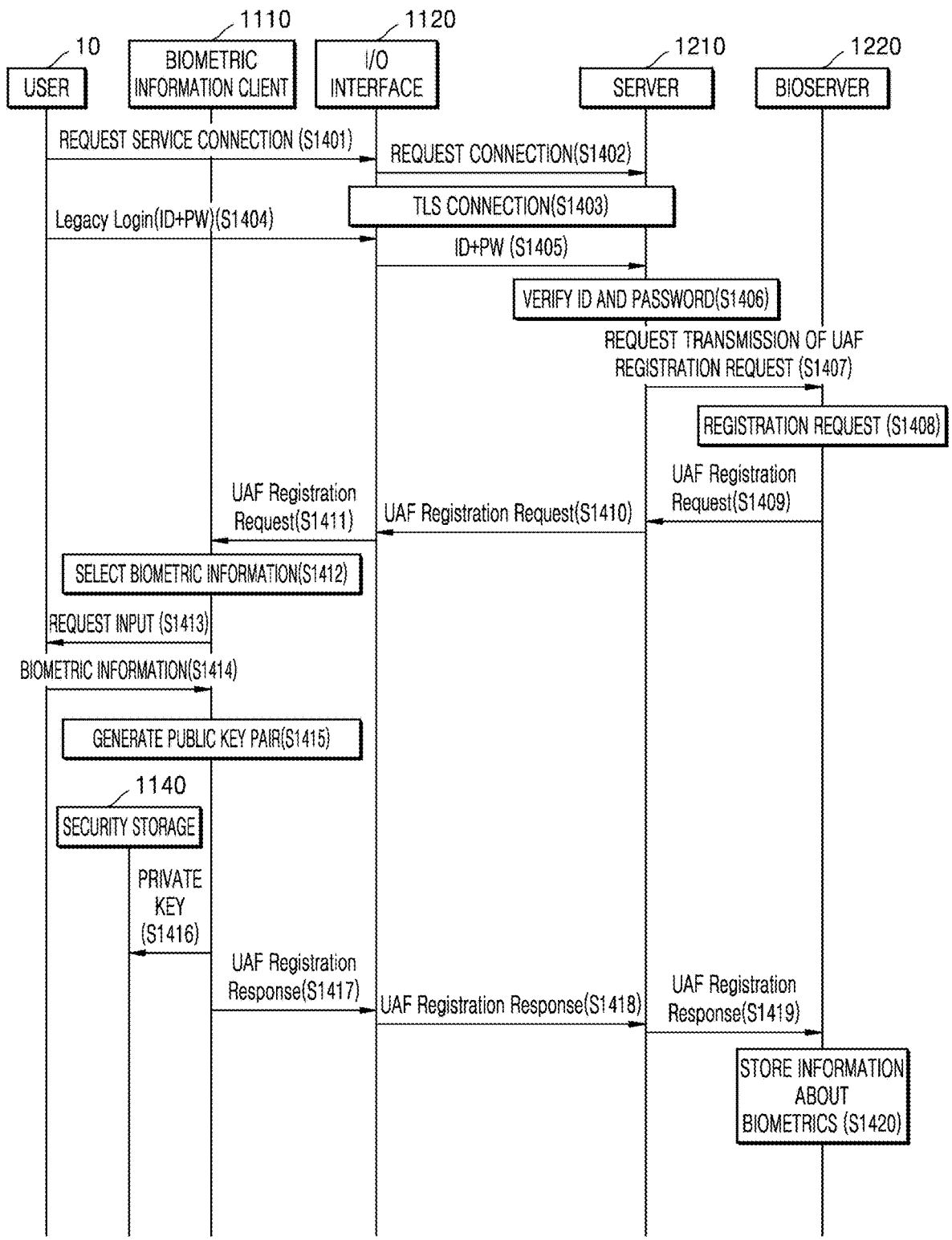
FIG. 14 illustrates a flow diagram for explaining a method of registering biometric information, according to an embodiment of the disclosure.

FIG. 14 illustrates a flow diagram for explaining a biometric information registration method according to an embodiment of the disclosure.

A user 10 may request a service connection from an I/O interface 1120 of a terminal (S1401). The user's request for the service connection may be made by executing an application or a web browser.

The I/O interface 1120 may request a connection from a server 1210 (S1402). The connection request may be made using an HTTP protocol. A TLS channel may be created as a secure communication channel between the I/O interface 1120 and the server 1210 (S1403).

The user 10 may request authentication by using a legacy authentication method, e.g., by inputting ID information such as a user's ID and password (S1404).

Information input by the user 10 is then transmitted to the server 1210 (S1405).

The server 1210 authenticates the user 10 based on the ID information input by the user 10 (S1406). For example, the server 1210 may authenticate the user by verifying ID and password input by the user 10.

The server 1210 transmits, based on a FIDO protocol, a registration request requesting transmission of a UAF registration request to the bioserver 1220.

The bioserver 1220 creates a policy to be used by the terminal for authentication based on biometric information (S1408). According to an embodiment of the disclosure, the policy may include information about a biometric technology to be used, such as items of biometric information (e.g., each user's face shape, iris, retina, veins, fingerprint, DNA, etc.) and information about an algorithm performed to obtain a template based on the biometric information.

The bioserver 1220 transmits a UAF registration request to the server 1210 based on a FIDO protocol (S1409). The UAF registration request may include the policy created in operation S1408.

The server 1210 transmits a UAF registration request to the I/O interface 1120 (S1410). The I/O interface 1120 transmits the UAF registration request to a biometric information client 1110 (S1411).

The biometric information client 1110 selects a biometric technology to be used for authentication, based on the policy contained in the UAF registration request (S1412). In detail, when a plurality of biometric technologies are supportable based on the policy, the biometric information client 1110 may request the user 10 to select and input his or her desired biometric technology (S1413). When the biometric information client 1110 itself selects or a single biometric technology is supportable, the biometric information client 1110 may request the user 10 to input biometric information corresponding to the biometric technology selected in operation S1413.

The user 10 provides the biometric information client 1110 with biometric information acquired based on the selected biometric technology (S1414).

The biometric information client 1110 generates a public key pair consisting of a private key and a public ley (S1415). Furthermore, the biometric information client 1110 obtains a template based on the biometric information acquired based on the selected biometric technology According to an embodiment of the disclosure, the biometric information client 1110 may generate a PI and corresponding AD based on the acquired biometric information. The biometric information client 1110 may select an algorithm to be used to generate the PI and AD, based on the selected biometric technology.

The biometric information client 1110 stores the generated private key in a security storage 1140 (S1416).

The biometric information client 1110 transmits a UAF registration response to the I/O interface 1120 (S1417). The UAF registration response may include the PI, AD, and public key generated in operation S1415.

The UAF registration response including the PI, AD, and public key is transmitted to the bioserver 1220 through the server 1210 (S1418 and S1419).

The bioserver 1220 may store the received PI and AD (S1420). The bioserver 1220 may store the received PI and AD in association with the user's ID.

Figure 15:
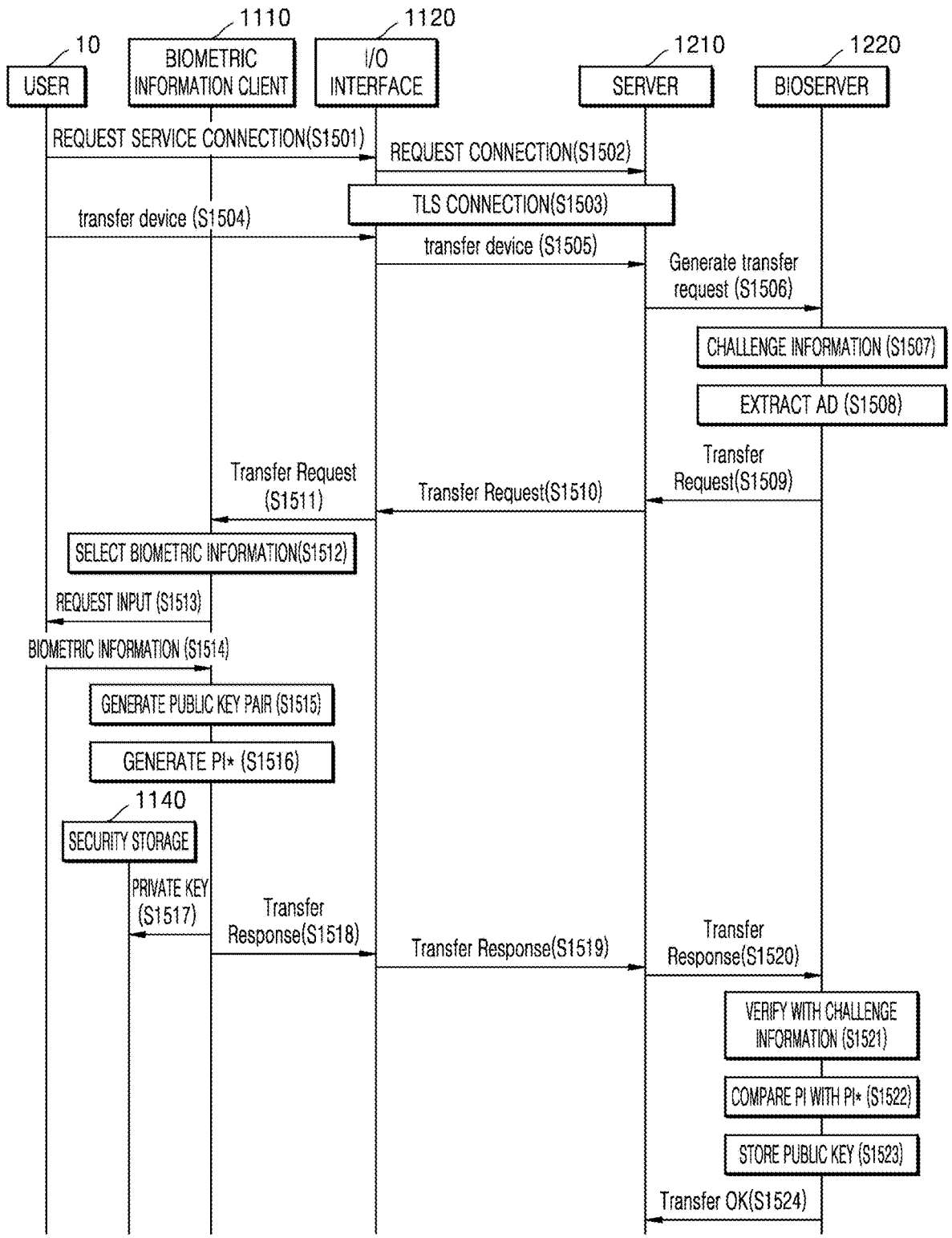
FIG. 15 illustrates a flow diagram for explaining a method of transferring biometric information, according to an embodiment of the disclosure.

FIG. 15 illustrates a flow diagram for explaining a method of transferring biometric information, according to an embodiment of the disclosure.

A user 10 may request a service connection from an I/O interface 1120 of a terminal (S1501). The user's request for the service connection may be made by executing an application or a web browser.

The I/O interface 1120 may request a connection from a server 1210 (S1502). The connection request may be made using an HTTP protocol. A TLS channel may be created as a secure communication channel between the I/O interface 1120 and the server 1210 (S1503).

The user 10 may input via the I/O interface 1120 a device transfer request (transfer device) requiring transfer of the used terminal to a current terminal (S1504). The device transfer request may include ID information of the user 10.

The device transfer request input by the user 10 is transmitted to the server 1210 (S1505).

The server 1210 transmits a request requesting transmission of a transfer request to the bioserver 1220 (S1506).

The bioserver 1220 generates challenge information and a policy to be used by the terminal for authentication based on biometric information (S1507). The challenge information may be information generated and stored by the server 1210 to verify the reliability and integrity of information transmitted by the terminal.

According to an embodiment of the disclosure, the policy may include information about a biometric technology to be used, such as items of biometric information (e.g., each user's face shape, iris, retina, veins, fingerprint, DNA, etc.) and information about an algorithm performed to obtain a template based on the biometric information. In addition, because a policy previously generated during registration has been registered with the bioserver 1220, the bioserver 1220 may use the registered policy intactly.

The bioserver 1220 may extract AD corresponding to a biometric technology selected by the policy in information related to the user's biometric information, which is stored during registration (S1508).

The bioserver 1220 transmits a transfer request to the server 1210 based on a FIDO protocol (S1509). The transfer request may include the policy and the challenge information generated in operation S1507 as well as the AD extracted in operation S1508.

The server 1210 transmits the transfer request to the I/O interface 1120 (S1510). The I/O interface 1120 transmits the transfer request to the biometric information client 1110 (S1511).

The biometric information client 1110 selects a biometric technology to be used for authentication, based on the policy contained in the transfer request (S1512). In detail, when a plurality of biometric technologies are supportable based on the policy, the biometric information client 1110 may request the user 10 to select and input his or her desired biometric technology (S1513). When the biometric information client 1110 itself selects a biometric technology or a single biometric technology is supportable, the biometric information client 1110 may request the user 10 to input biometric information corresponding to the biometric technology selected in operation S1513.

The user 10 provides the biometric information client 1110 with biometric information acquired based on the selected biometric technology (S1514).

The biometric information client 1110 generates a public key pair consisting of a private key and a public ley (S1515).

The biometric information client 1110 obtains a PI* based on the biometric information acquired based on the selected biometric technology and the AD transmitted from the server 1210 (S1516).

The biometric information client 1110 stores the generated private key in a security storage 1140 (S1517).

The biometric information client 1110 transmits a transfer response to the I/O interface 1120 (S1518). The transfer response may include the PI*, the public key, and the challenge information.

The transfer response including the PI*, the public key, and the challenge information is transmitted to the bioserver 1220 through the server 1210 (S1519 and S1520).

The bioserver 1220 verifies the reliability and integrity of received information by using the challenge information (S1521). According to an embodiment of the disclosure, the bioserver 1220 may verify the integrity of the received information by comparing the challenge information transmitted by the terminal with stored challenge information. According to an embodiment of the disclosure, the challenge information stored by the bioserver 1220 may vary over a predetermined time period. The bioserver 1220 may compare the received challenge information with the stored challenge information and determine, when they do not match each other, that the transfer response has expired.

When the verification is successful in operation S1521, the bioserver 1220 may compare the received PI* with a registered PI to determine whether to grant the transfer (S1522). When the transfer is granted, the bioserver 1220 may store the public key (S1523).

The bioserver 1220 may transmit information about a transfer result from the bioserver 1220 to the server 1210 (S1524).

Figure 16:
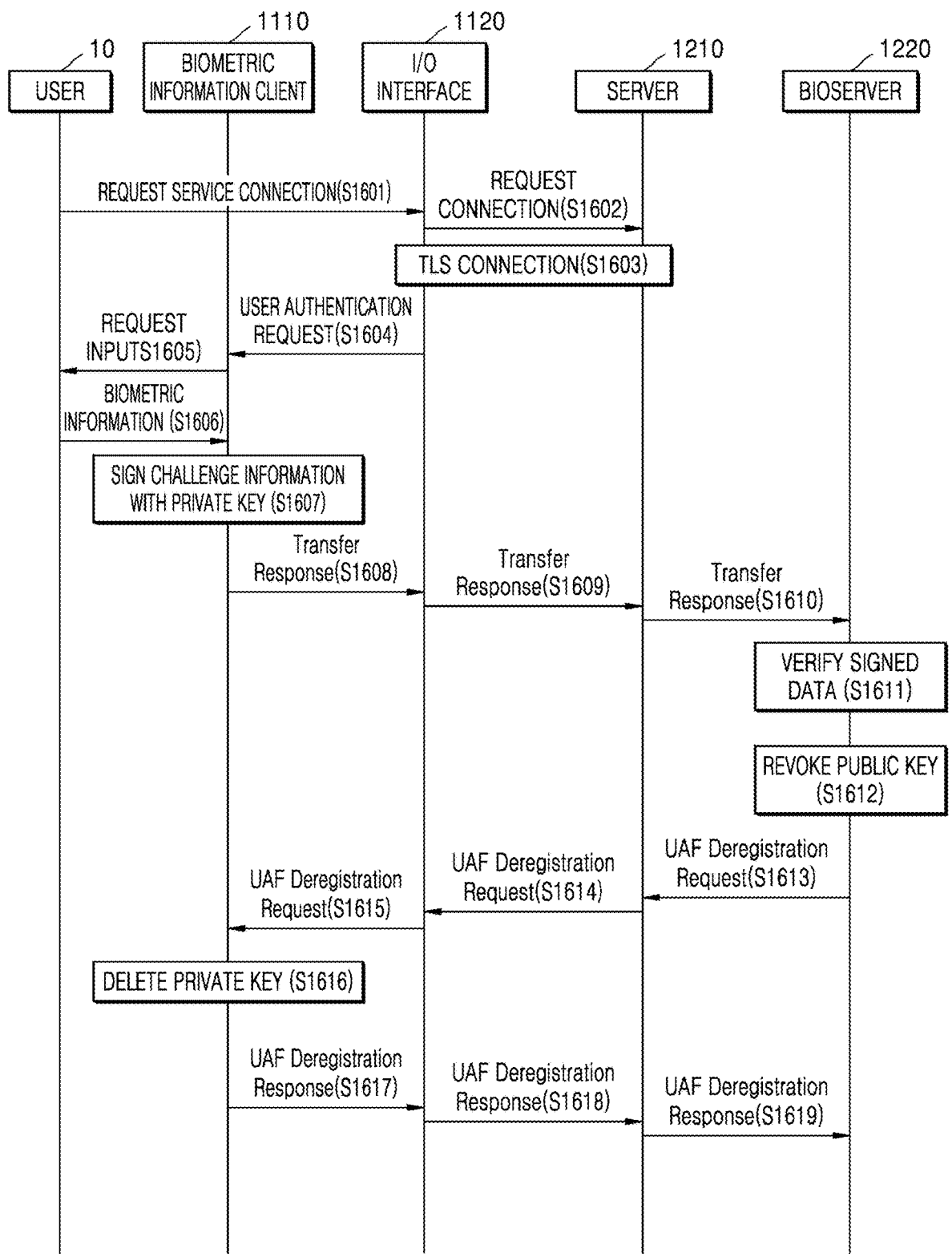
FIG. 16 illustrates a flow diagram for explaining a method of revoking biometric information, according to an embodiment of the disclosure.

FIG. 16 illustrates a flow diagram for explaining a method of revoking biometric information, according to an embodiment of the disclosure.

A user 10 may request a service connection from an I/O interface 1120 of a terminal (S1601). The user's request for the service connection may be made by executing an application or a web browser.

An I/O interface 1120 may request a connection from a server 1210 (S1602). The connection request may be made using an HTTP protocol. A TLS channel may be created as a secure communication channel between the I/O interface 1120 and the server 1210 (S1603).

After receiving information about a transfer result indicating that the transfer has been performed successfully and thus new public key has been registered, the I/O interface 1120 may request user authentication from a biometric information client 1110 in order to request authentication from the user 10 (S1604). The biometric information client 1110 may request the user 10 to input biometric information (S1605).

The biometric information input by the user 10 is transmitted to the biometric information client 1110 (S1606). When the user 10 is authenticated based on the user's biometric information, the biometric information client 1110 signs challenge information with a stored private key (S1607).

The biometric information client 1110 transmits a transfer response to the I/O interface 1120 (S1608). The transfer response may include the signed challenge information.

The transfer response including the signed challenge information is transmitted to a bioserver 1220 via the server 1210 (S1609 and S1610).

The bioserver 1220 verifies the challenge information signed with the private key by using a public key stored therein (S1611).

When the verification is completed, the bioserver 1220 revokes the stored public key (S1612). The bioserver 1220 transmits to the server 1210 a UAF deregistration request indicating revocation of the public key (S1613) The UAF deregistration request is transmitted to the biometric information client 1110 via the I/O interface 1120 (S1614 and S1615).

The biometric information client 1110 deletes a private key stored therein (S1616). Therefore, the registered public key and private key may be both revoked.

The biometric information client 1110 transmits a UAF deregistration response to the I/O interface 1120 (S1617). The UAF deregistration response is then transmitted to the bioserver 1220 via the server 1210 (S1618 and S1619).

The terminal 1100 described above may be implemented using hardware components, software components, and/or a combination thereof. For example, the devices and their components illustrated in the embodiments of the disclosure may be implemented using one or more general-purpose or special-purpose computers, such as a processor, a controller, an arithmetic logic unit (ALU), a digital signal processor, a microcomputer, a field programmable array (FPA), a programmable logic unit (PLU), a microprocessor, or any other device capable of responding to and executing instructions Although the present disclosure has been described with various embodiments, various changes and modifications may be suggested to one skilled in the art. It is intended that the present disclosure encompass such changes and modifications as fall within the scope of the appended claims.

What is claimed is:

1. A method, performed by a terminal, of registering biometric information, the method comprising:
   transmitting a registration request and biometric capability information of the terminal, which comprises information about biometric technologies supported by the terminal, to a server;
   receiving biometric capability information of the server from the server, wherein the biometric capability information of the server comprises information about a biometric technology supported by the terminal among a plurality of biometric technologies supported by the server;
   selecting a biometric technology from the plurality of biometric technologies supported by the server;
   acquiring a user's biometric information based on the selected biometric technology;
   acquiring a pseudonymous identifier and auxiliary data based on the user's biometric information; and
   transmitting the pseudonymous identifier and the auxiliary data to the server.

2. The method of claim 1, wherein:
   the biometric capability information comprises information about at least one biometric technology; and
   the information about the at least one biometric technology comprises an item of the at least one biometric technology and information about an algorithm performed to obtain a template.

3. The method of claim 2, wherein:
   the biometric capability information of the server includes information about at least one biometric technology supported by the terminal, the biometric technology being selected from among biometric technologies supported by the server based on the biometric capability information of the terminal.

4. The method of claim 1, wherein
   selecting a biometric technology from the plurality of biometric technologies supported by the server comprises:

presenting a plurality of biometric technologies to a user, based on the biometric capability information of the server, and
   receiving, from the user, an input of selecting one of the plurality of biometric technologies, and
   wherein acquiring the user's biometric information, based on the biometric capability information of the server comprises acquiring the user's biometric information based on the selected biometric technology.

5. The method of claim 1, wherein:
   the receiving of the biometric capability information of the server from the server comprises receiving, from the server, a public key certificate of the server, wherein the public key certificate of the server is issued by a certificate authority.

6. The method of claim 5, further comprising:
   encrypting, based on the public key certificate of the server, the pseudonymous identifier and the auxiliary data with the public key certificate of the server,
   wherein the transmitting of the pseudonymous identifier and the auxiliary data to the server comprises transmitting the encrypted pseudonymous identifier and the encrypted auxiliary data to the server.

7. The method of claim 5, wherein:
   the receiving of the biometric capability information of the server from the server comprises receiving challenge information from the server, wherein the challenge information includes information generated by the server to verify a reliability and integrity of information transmitted from the terminal.

8. The method of claim 7, further comprising:
   encrypting, based on the public key certificate, the pseudonymous identifier, the auxiliary data, and the challenge information by using the public key certificate of the server,
   wherein the transmitting of the pseudonymous identifier and the auxiliary data to the server comprises transmitting the encrypted pseudonymous identifier, the encrypted auxiliary data, and the encrypted challenge information to the server.

9. The method of claim 1, wherein:
   the terminal transmits or receives information to or from the server by using a transport layer security channel.

10. A terminal for authenticating a user by using biometric information, the terminal comprising:
    an input/output interface configured to transmit or receive information;
    a biometric information inputter configured to acquire the biometric information from the user; and
    a biometric information client,
    wherein the input/output interface is further configured to:
        transmit a registration request and biometric capability information of the terminal, which comprises information about biometric technologies supported by the terminal, to a server, and
        receive biometric capability information of the server from the server to transmit the biometric capability information of the server to the biometric information client,
    wherein the biometric capability information of the server comprises information about a biometric technology supported by the terminal among a plurality of biometric technologies supported by the server, and wherein the biometric information client is configured to:
control the biometric information inputter to:
- select a biometric technology from the plurality of biometric technologies supported by the server
- acquire the biometric information of the user based on the selected biometric technology,
- acquire a pseudonymous identifier and auxiliary data based on the biometric information of the user, and
- transmit the pseudonymous identifier and the auxiliary data to the server via the input/output interface.

11. The terminal of claim 10, wherein:
the biometric capability information comprises information about at least one biometric technology; and
the information about the at least one biometric technology comprises an item of the at least one biometric technology and information about an algorithm performed to obtain a template.

12. The terminal of claim 11, wherein:
the biometric capability information of the server includes information about at least one biometric technology supported by the terminal, the biometric technology being selected from among biometric technologies supported by the server based on the biometric capability information of the terminal.

13. The terminal of claim 10, wherein:
the biometric information client is further configured to:
control the biometric information inputter to present a plurality of biometric technologies to the user, based on the biometric capability information of the server and acquire; and
when an input of selecting one of the plurality of biometric technologies is received from the user, acquire the biometric information based on the selected biometric technology.

14. The terminal of claim 10, wherein:
the biometric information client is further configured to receive a public key certificate of the server via the input/output interface, wherein the public key certificate of the server is issued by a certificate authority.

15. The terminal of claim 14, wherein:
the biometric information client is further configured to encrypt, based on the public key certificate of the server, the pseudonymous identifier and the auxiliary data with the public key certificate of the server; and
transmit the encrypted pseudonymous identifier and the encrypted auxiliary data to the server via the input/output interface.

16. The terminal of claim 14, wherein:
the biometric information client is further configured to receive challenge information from the server, wherein the challenge information includes information generated by the server to verify a reliability and integrity of information transmitted from the terminal.

17. The terminal of claim 16, wherein:
the biometric information client is further configured to encrypt, based on the public key certificate of the server, the pseudonymous identifier, the auxiliary data, and the challenge information by using the public key certificate of the server and transmit the encrypted pseudonymous identifier, the encrypted auxiliary data, and the encrypted challenge information to the server via the input/output interface.

18. The terminal of claim 10, wherein:
the terminal transmits or receives information to or from the server by using a transport layer security channel.

19. The terminal of claim 10, wherein:
the biometric information client is located in a security region of the terminal and is blocked from external access.

20. A method, performed by a biometric information authentication system, of registering biometric information, the method comprising:
- transmitting, by a terminal, a registration request and biometric capability information of the terminal, which comprises information about biometric technologies supported by the terminal, to a server;
- transmitting, by the server, biometric capability information of the server to the terminal, wherein the biometric capability information of the server comprises information about a biometric technology supported by the terminal among a plurality of biometric technologies supported by the server;
- selecting, by the terminal, a biometric technology from the plurality of biometric technologies supported by the server;
- acquiring, by the terminal, a user's biometric information based on the selected biometric technology;
- acquiring, by the terminal, a pseudonymous identifier and auxiliary data based on the user's biometric information; and
- transmitting, by the terminal, the pseudonymous identifier and the auxiliary data to the server.

* * * * *